(12) United States Patent
DeMent et al.

(10) Patent No.: US 8,249,239 B2
(45) Date of Patent: Aug. 21, 2012

(54) CUSTOMIZED RINGBACK AND COMMUNICATIONS

(75) Inventors: Jeffrey M. DeMent, Hoffman Estates, IL (US); Ravi Ganesh Ramamoorthy, Bangalore (IN)

(73) Assignee: LiveWire Mobile, Inc., Littleton, MA (US)

( * ) Notice: Subject to any disclaimer, the term of this patent is extended or adjusted under 35 U.S.C. 154(b) by 1488 days.

(21) Appl. No.: 11/805,717

(22) Filed: May 24, 2007

(65) Prior Publication Data

US 2007/0286372 A1 Dec. 13, 2007

Related U.S. Application Data

(60) Provisional application No. 60/808,449, filed on May 25, 2006, provisional application No. 60/833,421, filed on Jul. 25, 2006.

(51) Int. Cl.
*H04M 3/42* (2006.01)

(52) U.S. Cl. ............... 379/207.16; 379/373.02

(58) Field of Classification Search ............. 379/201.08, 379/207.16, 211.01, 373.01, 373.02, 204.01
See application file for complete search history.

(56) References Cited

U.S. PATENT DOCUMENTS

| | | | |
|---|---|---|---|
| 6,798,786 B1 * | 9/2004 | Lo et al. ................. | 370/468 |
| 2003/0007483 A1 | 1/2003 | Um | |
| 2005/0105706 A1 * | 5/2005 | Kokkinen ............... | 379/201.01 |
| 2005/0117726 A1 * | 6/2005 | DeMent et al. ......... | 379/142.01 |
| 2006/0182247 A1 * | 8/2006 | Batni et al. ............. | 379/189 |

OTHER PUBLICATIONS

Sawhney, Nitin et al. "Nomadic Radio: Speech & Audio Interaction for Contextual Messaging in Nomadic Environments", In ACM Transactions on Computer-Human Interaction (TOCHI), vol. 7, Issue 3 (Sep. 2000)—Special issue on human-computer interaction with mobile systems, p. 353-383. Year of publication: 2000 (retrieved on Nov. 3, 2007). Retrieved from the Internet: <URL: http://media.mit.edu/speech/papers/2000/sawhney_ToCHI00_nomadic_radio.pdf>.

Camarillo, G. et al. IETF RFC 3960 Early Media and Ringing Tone Generation in the Session Initiation Protocol (SIP), Dec. 2004, p. 1-13, Copyright (C) The Internet Society (2004), http://www.ietf.org/rfc/rfc3960.txtRFC 3960.

(Continued)

*Primary Examiner* — Curtis Kuntz
*Assistant Examiner* — Amal Zenati
(74) *Attorney, Agent, or Firm* — Chapin IP Law, LLC

(57) ABSTRACT

Request information received by a call handler system specifies multiple acceptable call connection encoding options or formats for communicating with a caller. The call handler system forwards the multiple acceptable call connection encoding options to a called destination. The called destination responds with a selection of a first call connection option from the multiple call connection options. The call handler system selects a second call connection option for providing a ring-back tone to the caller while waiting for the called destination to answer his phone. During the wait, the call handler system provides a ring-back tone to the caller via the second call connection encoding option. Upon detection of the called destination answering his phone, the call handler system discontinues playback of the ring-back tone and notifies the caller to communicate with the called destination via the first call connection encoding option as selected by the called destination.

13 Claims, 20 Drawing Sheets

OTHER PUBLICATIONS

3GPP Organizational Partners (ARIB, ATIS, CCSA, ETSI, TTA, TTC), 3GPP TS 22.182, 3rd Generation Partnership Project; Technical Specification Group Services and System Aspects; Customized Alerting Tones (CAT) Requirements; Stage 1 (Release 8); Apr. 2007, p. 1-13.

Ejzak, R. "Private Header (P-Header) Extension to the Session Initiation Protocol (SIP) for Authorization of Early Media", Sep. 2007, p. 1-15, http://www.tools.ietf.org/html/rfc5009.

International Search Report, dated Dec. 14, 2007, p. 1.

European Telecommunications Standards Institute 2007, "Telecommunications and Internet Converged Services and Protocols for Advanced Networking (TISPAN); Requirements for Customized Originating and Terminating Multimedia Information Presentation (COMIP/CTMIP) and Customized Originating and Terminating Multimedia Information Filtering (COMIF/CTMIF) Requirements Analysis", Aug. 2007, p. 1-41, ETSI TR 181 015 v2.0.1 (Technical Report), France, http://www.etsi.org.

\* cited by examiner

2800 →

[2810] PROVIDE A VOICE COMMUNICATION CHANNEL THROUGH A FIRST CALL LEG AND A SECOND CALL LEG ENABLING COMMUNICATIONS BETWEEN A CALLER AND A TARGET DESTINATION (E.G., CALLED PARTY)

↓

[2820] INITIATE TRANSMISSION OF AN INITIAL REQUEST TO A REMOTE COMMUNICATION DEVICE TO ESTABLISH A CALL CONNECTION BRIDGE BETWEEN THE CALLER PARTY AND THE CALLED PARTY

↓

[2830] DETECT AN INABILITY OF THE REMOTE COMMUNICATION DEVICE TO ESTABLISH THE CALL CONNECTION BRIDGE

↓

[2840] CONTINUE TO PROVIDE THE VOICE COMMUNICATION CHANNEL THROUGH THE FIRST CALL LEG AND THE SECOND CALL LEG ENABLING COMMUNICATIONS BETWEEN THE CALLER PARTY AND THE CALLED PARTY

↓

[2850] INITIATE TRANSMISSION OF A SUBSEQUENT REQUEST TO THE REMOTE COMMUNICATION DEVICE TO ESTABLISH THE CALL CONNECTION BRIDGE BETWEEN THE CALLER PARTY AND THE CALLED PARTY

↓

[2860] DETECT AN ABILITY OF THE REMOTE COMMUNICATION DEVICE TO ESTABLISH THE CALL CONNECTION BRIDGE

↓

[2870] INITIATE TERMINATION OF THE VOICE COMMUNICATION CHANNEL THROUGH THE FIRST CALL LEG AND THE SECOND CALL LEG

FIG. 8

CUSTOMIZED RINGBACK AND COMMUNICATIONS

RELATED APPLICATIONS

This application is related to and claims the benefit of earlier filed U.S. Provisional Patent Application Ser. No. 60/808,449, entitled "Ringback Tone Platform Network Integration," filed on May 25, 2006, the entire teachings of which are incorporated herein by this reference.

This application is related to and claims the benefit of earlier filed U.S. Provisional Patent Application Ser. No. 60/833,421, entitled "Ringback Tone Platform for IP Network," filed on Jul. 25, 2006, the entire teachings of which are incorporated herein by this reference.

This application is related to United States patent application entitled "CUSTOMIZED RINGBACK AND COMMUNICATIONS," (Ser. No. 11/805,836), filed on the same date as the present application, the entire teachings of which are incorporated herein by this reference.

BACKGROUND

During past years, several network operators around the world have introduced personalized RingBack Tone (RBT) services. Such a service enables a subscriber to choose a custom audio clip (e.g., a favorite song) to be played back to a caller phone during a ringing portion of a call, prior to a called party answering the call. Thus, instead of hearing a standard ring-back tone (at the caller's phone) indicating that a target phone is being alerted of the incoming call connection request, the caller hears the custom audio clip selected by the subscriber.

According to one conventional application, a subscriber of the custom ring-back tone service may specify one of several audio clips to be played back to a caller based on factors such as caller identification, time-of-day, or other factors. The purpose of the audio clip (e.g., custom ringback tone) can be entertainment, advertising, or corporate identification/branding.

A conventional architecture for providing custom ring-back tones includes a Mobile Switching Center (MSC), a Home Location Register (HLR), and a ring-back tone generator. In such an architecture, software in a network operator's MSC, in conjunction with the Home Location Register (HLR), identifies which received calls have been placed to corresponding subscribers of the ring-back service. For such calls, the MSC sets up a voice path to the ring-back tone generator for conveying a ring-back tone to the caller phone while also placing an outbound call connection to alert the subscriber of the call placed by the caller phone. The ring-back tone generator then plays the selected audio clip back to the caller through the voice path while the subscriber phone is alerted of the incoming call connection request. When the MSC detects that the subscriber answers his alerting phone, or the target phone abandons the call, the MSC releases the voice path to the ring-back tone generator and continues on with normal call handling. For example, after detecting that the subscriber answers his phone, the MSC breaks a link to the ring-back tone generator and bridges the caller phone to the subscriber phone via a voice communication channel so that the subscriber and the caller can talk with each other without the custom ring-back tone being played.

SUMMARY

Embodiments herein enable a corresponding call handler system to initiate playback of customized ring-back tones in IP network applications such as those supporting switching of VOIP data packets and/or VOIP phone connections. For example, a call handler system can receive (e.g., via IP encoded data packets) request information from a caller (e.g., an IP phone user or an IP gateway acting on behalf of a cellular phone or PSTN caller) to establish a call connection with a called destination. In one embodiment, the request information received by the call handler system from the caller specifies multiple acceptable call connection encoding options for communicating with the caller. The call handler system forwards the multiple acceptable call connection encoding options to the called destination. The called destination responds with a selection form the multiple options. For example, the call handler system receives, from the called destination, selection of a first call connection encoding option from the multiple acceptable call connection encoding options. The call handler system (or corresponding media player system) selects a second call connection option for providing a ring-back tone to the caller while waiting for the called destination to answer his phone. During the wait, the call handler system provides a ring-back tone (and/or custom video image data) to the caller via the second call connection encoding option. Upon detection of the called destination answering his phone, the call handler system discontinues playback of the ring-back tone and notifies the caller to communicate with the called destination via the first call connection encoding option as selected by the called destination.

As discussed, techniques herein are well suited for use in applications providing customized ring-back tone services. However, it should be noted that configurations herein are not limited to use in such applications and thus configurations herein and deviations thereof are well suited for other applications as well.

Other configurations include a computerized device (e.g., a host computer, workstation, etc.) configured to support the aforementioned method operations disclosed herein as configurations to provide or support customized ring-back tone services. In such configurations, the computerized device includes a memory system, a network/communication interface, a processor (e.g., a processing device), an optional display, and an interconnect. The interconnect supports communications among the processor, the memory system and the optional display. The network/communication interface supports communication with remote devices with respect to the computer. The memory system is encoded with an application that, when executed on the processor, produces a process that supports custom ring-back tone services.

Yet other configurations disclosed herein include software programs to perform the method configuration and operations summarized above and disclosed in detail below under the heading Detailed Description. More particularly, a computer program product (e.g., a computer-readable medium) including computer program logic encoded thereon may be executed on a computerized device to support techniques as explained herein. That is, the computer program logic, when executed on at least one processor with a computing system, causes the processor to perform the operations (e.g., the methods) indicated herein. Such arrangements are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular configuration is directed to a computer program product that includes a computer readable medium having instructions stored thereon for supporting custom ring tone services. The instructions, when carried out by a processor of a respective computer device, cause the processor to perform the steps of: i) receiving request information from a caller to establish a call connection with a called destination, the request information specifying multiple acceptable call connection encoding options for communicating with the caller; ii) forwarding the multiple acceptable call connection encoding options to the called destination; iii) receiving, from the called destination, selection of a first call connection encoding option from the multiple acceptable call connection encoding options; iv) providing a ring-back tone to the caller via a second call connection encoding option of the multiple acceptable call connection encoding options; and v) after providing the ring-back tone to the caller using via the second call connection encoding option, notifying the caller to communicate with the called destination via the first call connection encoding option.

Other embodiments of the present disclosure include hardware and/or software programs to perform any of the method embodiment steps and operations summarized above and disclosed in detail below.

It should be understood that the system disclosed herein may be embodied strictly as a software program, as software and hardware, or as hardware alone. The features disclosed herein may be employed in data communications devices and other computerized devices and software systems for such devices such as those manufactured by NMS Communications Corporation of Framingham, Mass.

Techniques herein are well suited for use in applications such as those supporting customized ring-back tones. However, it should be noted that configurations herein are not limited to such use and thus configurations herein and deviations thereof are well suited for use in other environments as well.

It should be noted that each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features, and advantages of the presented techniques herein will be apparent from the following more particular description of preferred configurations, as illustrated in the accompanying drawings in which like reference characters refer to the same parts throughout the different views. The drawings are not necessarily to scale, with emphasis instead being placed upon illustrating embodiments, techniques, and concepts herein.

FIGS. 5-11 are diagrams of example flowcharts according to embodiments herein.

DETAILED DESCRIPTION

The description below describes several different examples of supporting custom ring-back tone services in different types of phone service networks.

Figure 1:
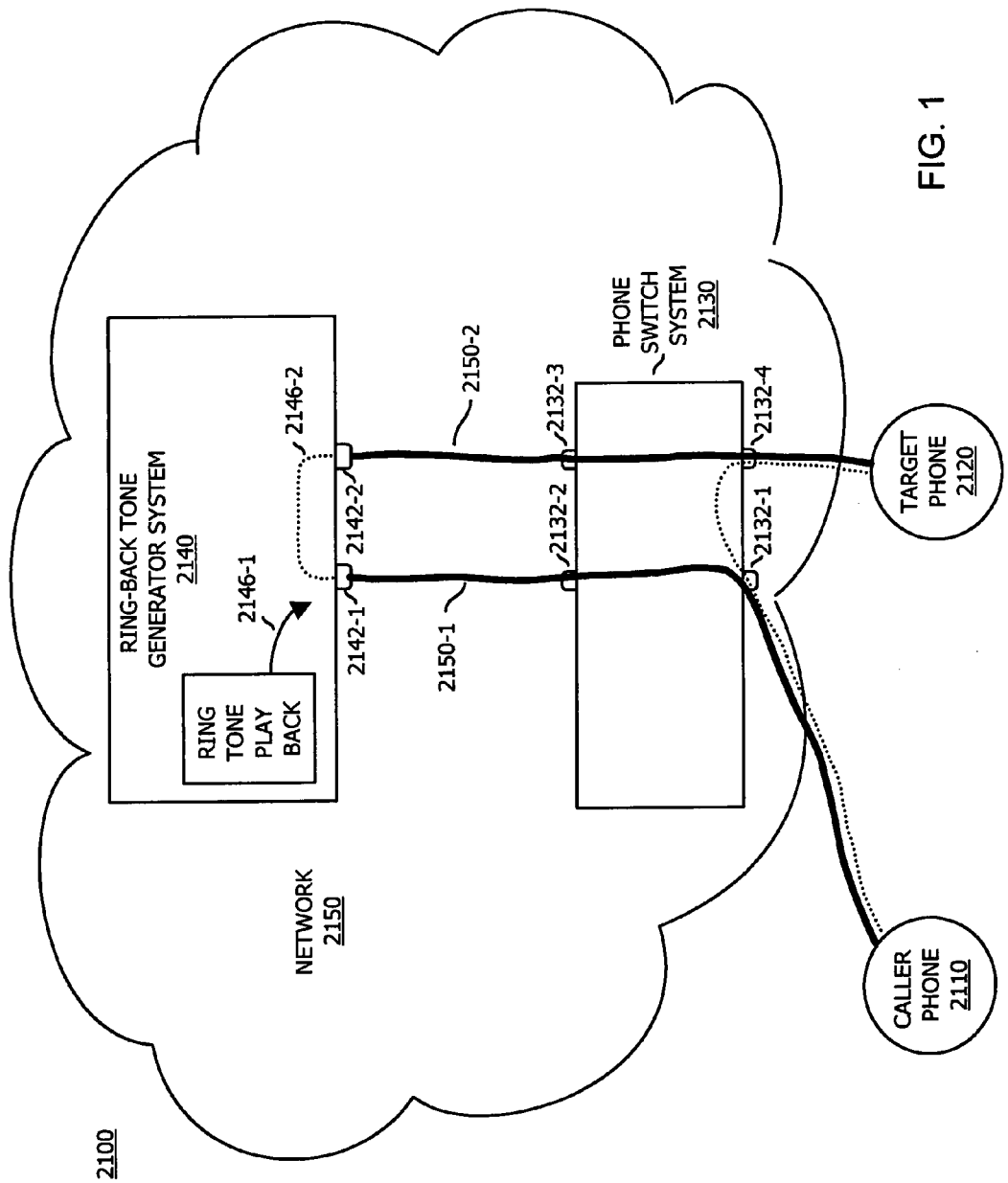
FIG. 1 is an example diagram of a communication system in which a ring-back tone generator system handles a received call according to embodiments herein.

FIG. 1 is a diagram of a communication system 2100 illustrating use of customized ring-back tones during establishment of a phone connection according to embodiments herein. As shown, communication system 2100 includes a caller phone 2110 and a target phone 2120 in communication with network 2150. Network 2150 includes phone switch system 2130 (e.g., a switch resource) and ring-back tone generator system 2140. Phone switch system 2130 includes trunk 2132-1, trunk 2132-2, trunk 2132-3, and trunk 2132-4 (collectively trunks 2132 or communication port resources). Ring-back tone generator system 2140 includes trunk 2142-1 and trunk 2142-2 (collectively trunks 2142).

Communication system 2100 supports custom ring-back tones for calls to certain subscribers of such a phone plan. For example, a custom ring-back tone service according to embodiments herein (as provided by communication system 2100) enables a subscriber to choose a custom audio clip (e.g., a favorite song or other stream of audible data) to be played back to a caller phone during a ringing portion of a call, prior to the subscriber answering an attempted call. Thus, instead of hearing a standard ring-back tone (at the caller phone 2110) indicating that a target phone 2120 is being alerted of the incoming call connection request, the caller phone 2110 hears the custom audio clip (e.g., a song) selected by the subscriber while the target 2120 is alerted.

In the context of the present example, during general operation, caller phone 2110 initiates a call to target phone 2120 (such as a subscriber of the custom ring-back tone service) by transmitting a call connection request to phone switch system 2130 such as an MSC as mentioned above. In one configuration, call connection request includes an identifier of the caller phone 2110 as well as an identifier of the target phone 2120. Upon receipt of call request information, the phone switch system 2130 first compares information such as the identifier of the called party in the call connection request to a corresponding table (e.g., a map) of the phone switch system 2130 to identify whether the called party (e.g., target phone 2120) is a subscriber of an enhanced service requiring interaction with an external peripheral such as the ring-back tone generator system 2140. If so, the phone switch system 2130 forwards (e.g., hands off) the call connection request (as received from caller 2110) to ring-back tone generator system 2140 for further call processing by the ring-back tone generator system 2140. If not, the phone switch system 2130 proceeds with normal call handling routines to provide a call connection between the caller phone 2110 and the target phone 2120.

For the case when phone switch system 2130 redirects the call connection request because the caller or corresponding caller phone 2110 is a subscriber of the ring-back tone generator service, the phone switch system 2130 forwards the call connection request to ring-back tone generator system 2140 indicating the request by caller phone 2110 to connect to target phone 2130. Phone switch system 2130 participates in establishing a call connection leg 2150-1 between trunk 2132-2 and trunk 2142-1.

In response to receiving the call connection request as received from phone switch system 2130 over leg 2150-1, ring-back tone generator system 2140, in turn, transmits a call connection request to phone switch system 2130 to establish call connection leg 2150-2. As shown, establishing call connection leg 2150-2 can include assigning a trunk 2142-2 of ring-back tone generator system 2140 and trunk 2132-3 of phone switch system 2130 to create call connection leg 2150-2.

Call connection leg 2150-1 supports communications through trunk 2142-1 of ring-back tone generator system 2140 and through trunk 2132-2 and trunk 2132-1 of phone switch system 2130 to caller phone 2110.

While alerting the target phone 2120 (e.g., causing the target phone 120 to ring) of the incoming call by caller phone 2110, the ring-back tone generator system 2140 provides a custom ring-back tone to caller phone 2110. When a subscriber of the target phone 2120 answers the target phone 2120, the ring-back tone generator system 2140 discontinues the ring-back tone on call connection leg 2150-1 to caller phone 2110 and potentially creates bridge 2146-2 so that a user of caller phone 2110 and subscriber of target phone 2120 can speak with each other. As previously discussed, prior to creating bridge 2146-2 connecting the caller to the target, the ring-back tone generator system 2140 plays back custom ring tone 2116 over link 2146-1 while alerting the target 2120 of the incoming call via leg 2150-2.

Figure 2:
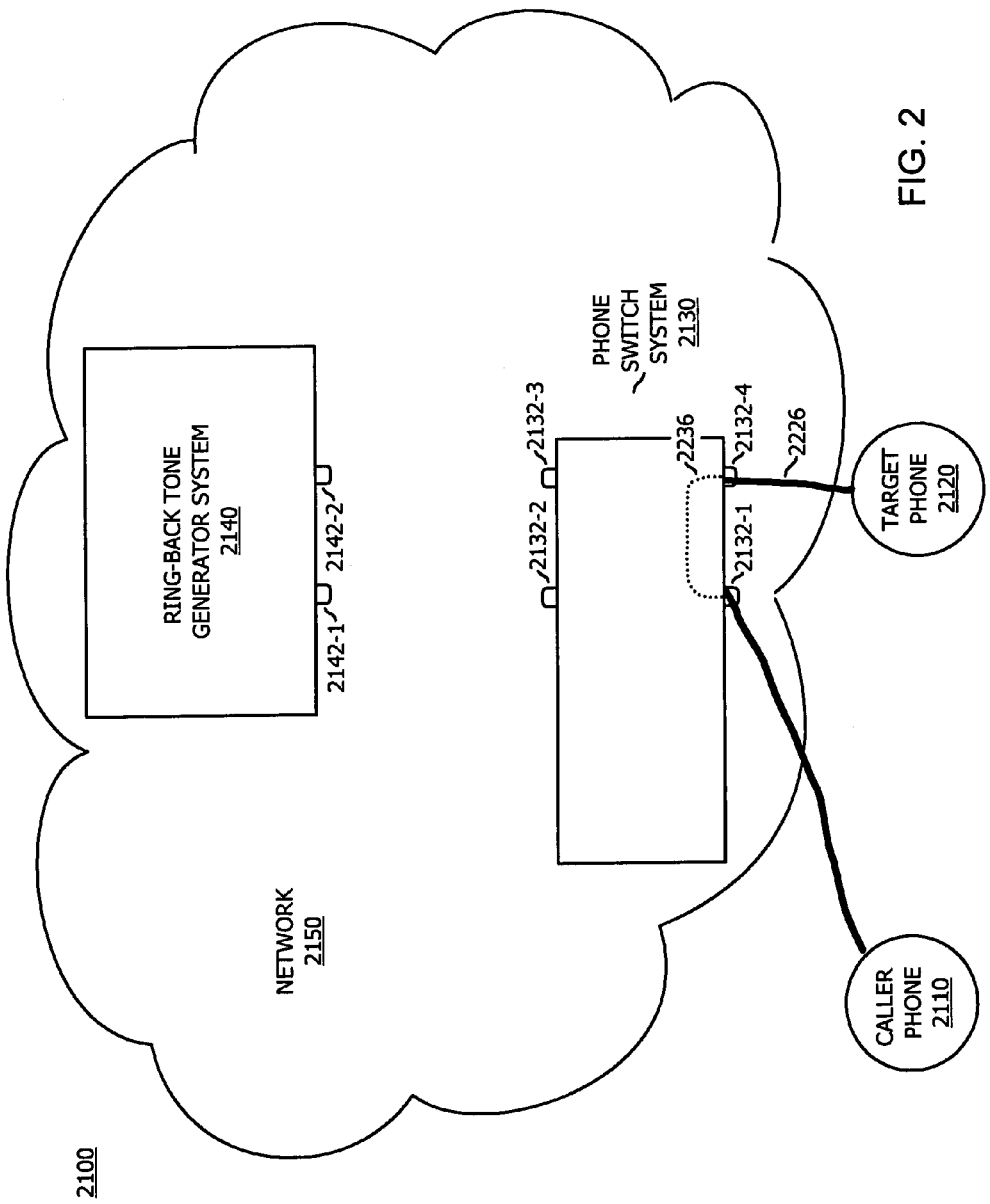
FIG. 2 is an example diagram of a communication system in which a phone switch system establishes a bridge for connecting a caller to a called party according to embodiments herein.

In one configuration, after at least temporarily providing bridge 2146 to connect the caller phone 2110 to the target phone 2120 via a voice communication channel, the ring-back tone generator system 2140 transmits a message to phone switch system 2130 requesting the phone switch system 2130 to provide a bridge connecting the caller 2110 and the target 2120 in lieu of the phone switch system 1130 providing bridge 2146-2. In response, the phone switch system 2130 provides bridge 2236 as shown in FIG. 2 to free resources such as leg 2150-1, leg 2150-2, trunk 2142-1, trunk 2142-2, trunk 2132-2, and trunk 2132-3. Note that the phone switch system 2130 can include a network of multiple switches. Accordingly, bridge 2236 may be created between two or more separately located switch devices in a switch fabric.

Figure 3:
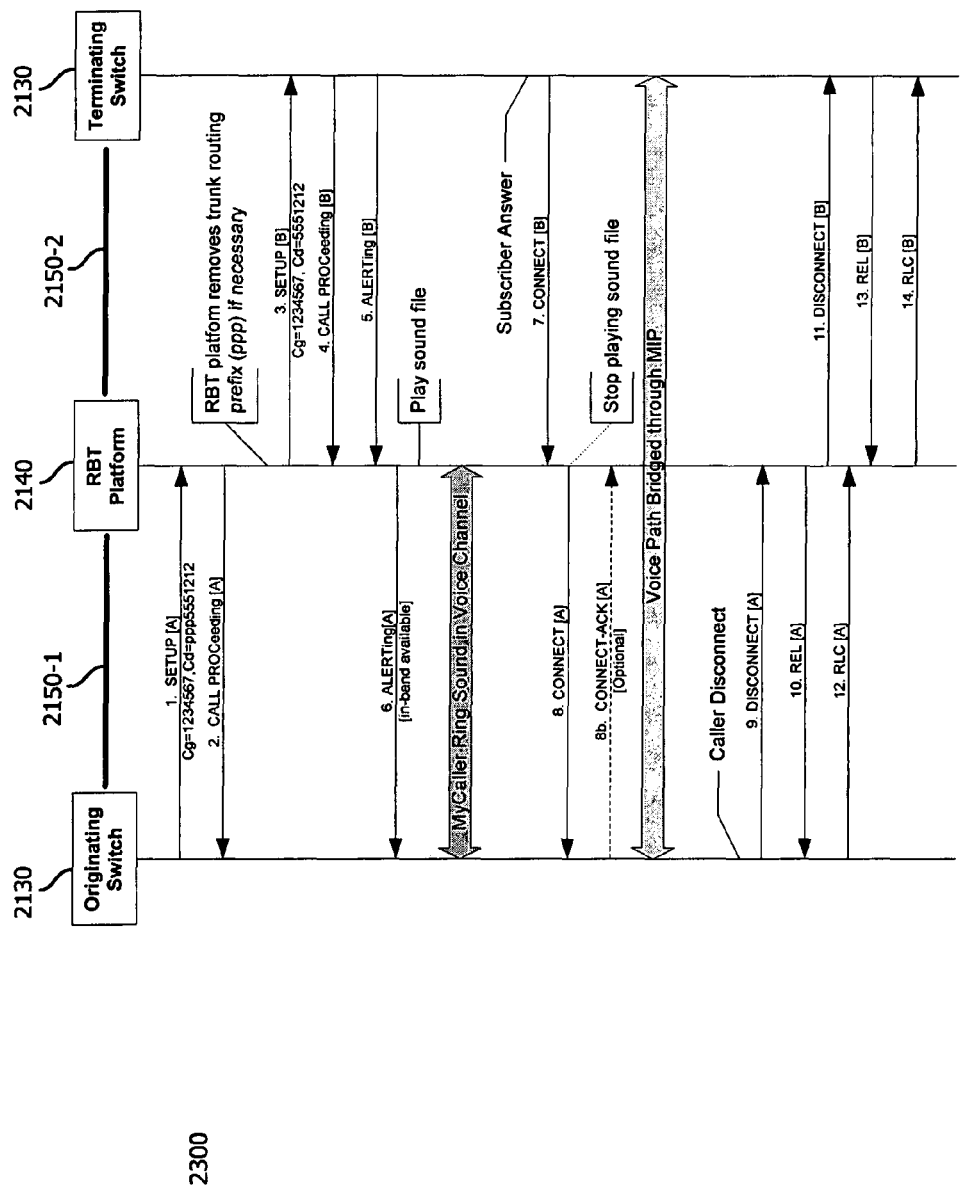
FIG. 3 is an example timing diagram illustrating call handling according to embodiments herein.

FIG. 3 is a timing diagram 2300 illustrating an example implementation of customized ring-back tones and related processes according to embodiments herein. For example, timing diagram 2300 illustrates service operation using ISDN trunks.

Service Operation Using ISDN Trunks

One method for the service node approach uses ISDN primary rate interface (PRI) trunks to form the interface between the phone switch system 2130 (e.g., MSC) and the ring-back tone generator system 2140 (e.g., RBT platform). This approach may be attractive for landline networks that are likely to be equipped with ISDN PRI trunks.

An example call flow for the ISDN service node implementation is analogous to the SS7 ISUP implementation of the previous sections.

Figure 4:
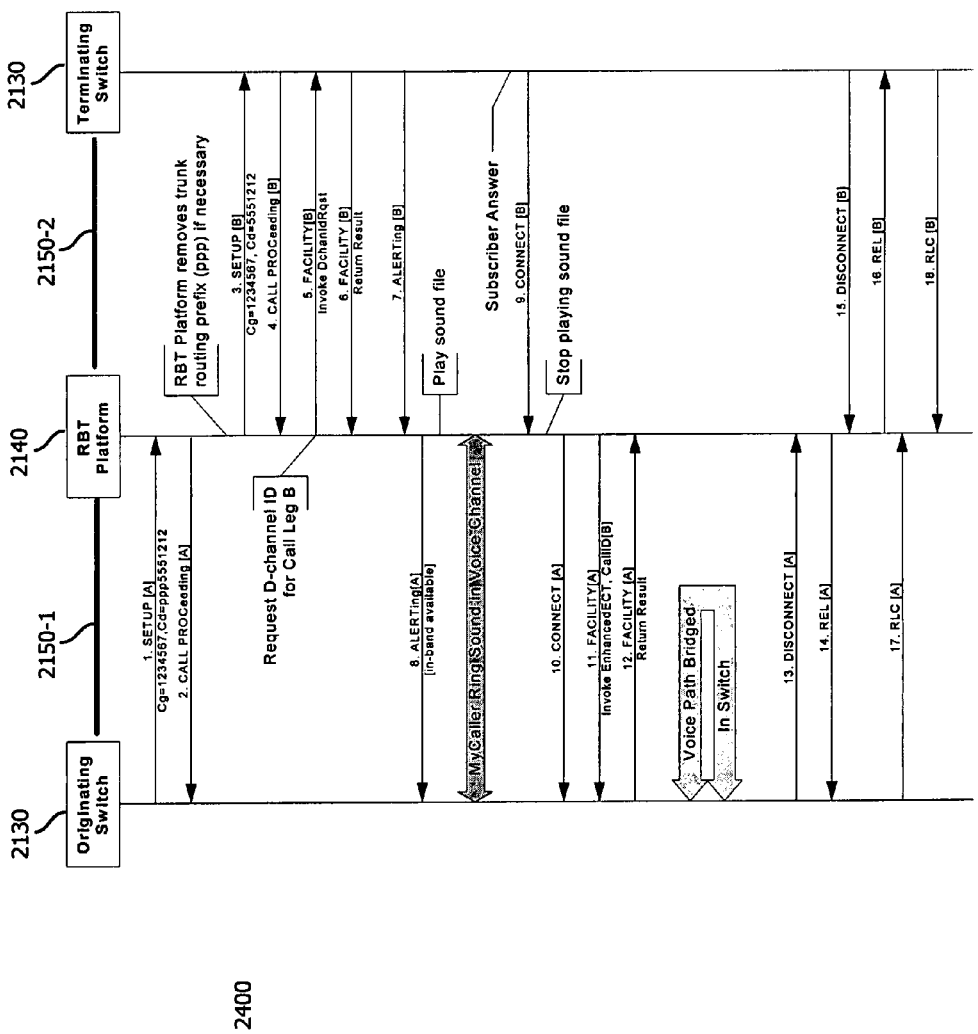
FIG. 4 is an example timing diagram illustrating call handling according to embodiments herein.

FIG. 4 is a timing diagram 2400 illustrating an example implementation of customized ring-back tones and related processes according to embodiments herein. For example, timing diagram 2400 illustrates service operation using an ISDN service and two B channel transfer techniques.

ISDN Service Node Operation with Two B-Channel Transfer

Some ISDN protocol variants (for example, US National ISDN-2) support a feature called two B-channel transfers (i.e., TBCT). The TBCT capability can be adapted for use in a ring-back tone generator system 2130, having 2 related calls in progress. According to embodiments herein one purpose of the TCBT request is to request that phone switch system 2130 connect those two calls together and drop the enhanced service platform connection (e.g., bridge 2146-2) from the call.

Use of TBCT can significantly reduce the voice trunk utilization between phone switch system 2130 (e.g., a switch) and an RBT platform (e.g., ring-back tone generator system 2140) using a service node implementation. For example, the ring-back tone generator system 2140 can drop out of the call (and thus releases the switch-to-RBT platform trunks used for that call) after a corresponding subscriber (e.g., target) answers the call. This technique is useful for reducing the number of trunks required on both the phone switch system 2130 and the ring-back tone generator system 2140 to support a given subscriber base by a significant factor, reducing the cost of deploying customized ring-back tone generator services.

The equipment (e.g., ring-back tone generator system 2140 and phone switch system 2140) employed in communication system 2100 and the initial call setup can be based on the normal ISDN service node implementation as discussed above. In such an embodiment, after the RBT platform (e.g., ring-back tone generator system 2140) detects that a call is answered, the RBT platform can request (via use of a TBCT type of request) that the adjacent switch (e.g., or switches in phone switch system) bridge the two call legs (e.g., the leg between caller 2110 and phone switch system 2130 as well as the leg between phone switch system 2130 and target 2120) together.

If the phone switch system 2130 can satisfy this request, the phone switch system 2130 connects the specified call legs together within its internal switch fabric and releases the two trunk circuits (e.g., 2132-2 and 2132-3). If the switch can't satisfy the TBCT request, for example, due to blocking in its internal switch fabric or other internal resource failure, the ring-back tone generator system 2140 connects the caller to the target 2120 internally via its own switch fabric. The ring-back tone generator system 2140 can support a voice channel in the call connection path between the caller 2110 and the target 2120 for all, part, or no part of the call.

Some switch implementations only allow transmission of the TBCT request after the outbound call leg toward the ring-back tone subscriber is answered, but not during a network tone or announcement. In this case, the ring-back tone generator system 2130 uses its internal switch fabric to connect the calls together once a network tone or announcement is detected. This normally does not significantly affect the trunk utilization since the percentage of calls terminating to tone or announcement is typically low and the duration of those calls is usually short.

As mentioned above, FIG. 24 illustrates an example of a TBCT implementation using the US National ISDN-2 signaling protocol variant. The exact message sequence used to request TBCT and the detailed parameters used to identify the calls to be connected may be different for other ISDN protocol variants.

Steps 1-4 Standard call setup for ISDN service node call.

Steps 5-6 Upon receipt of the call proceeding message for the outbound call segment, the RBT platform (if necessary) retrieves the D-channel identifier for the trunk used for this call. This is needed later when TBCT is requested.

Steps 7-8 Upon notification that the called party is alerting, the RBT platform plays the selected audio back to the calling party.

Steps 9-12 Upon notification that the called party has answered the call, the RBT platform requests the switch to transfer the two call segments together.

Steps 13-18 Upon successful transfer of the two call segments, the switch disconnects both call legs toward the RBT platform with standard ISDN disconnect messages.

Functionality supported by ring-back tone generator system 2140 and phone switch system 2130 and other resources will now be discussed via flowcharts in FIGS. 25-31.

Figure 5:
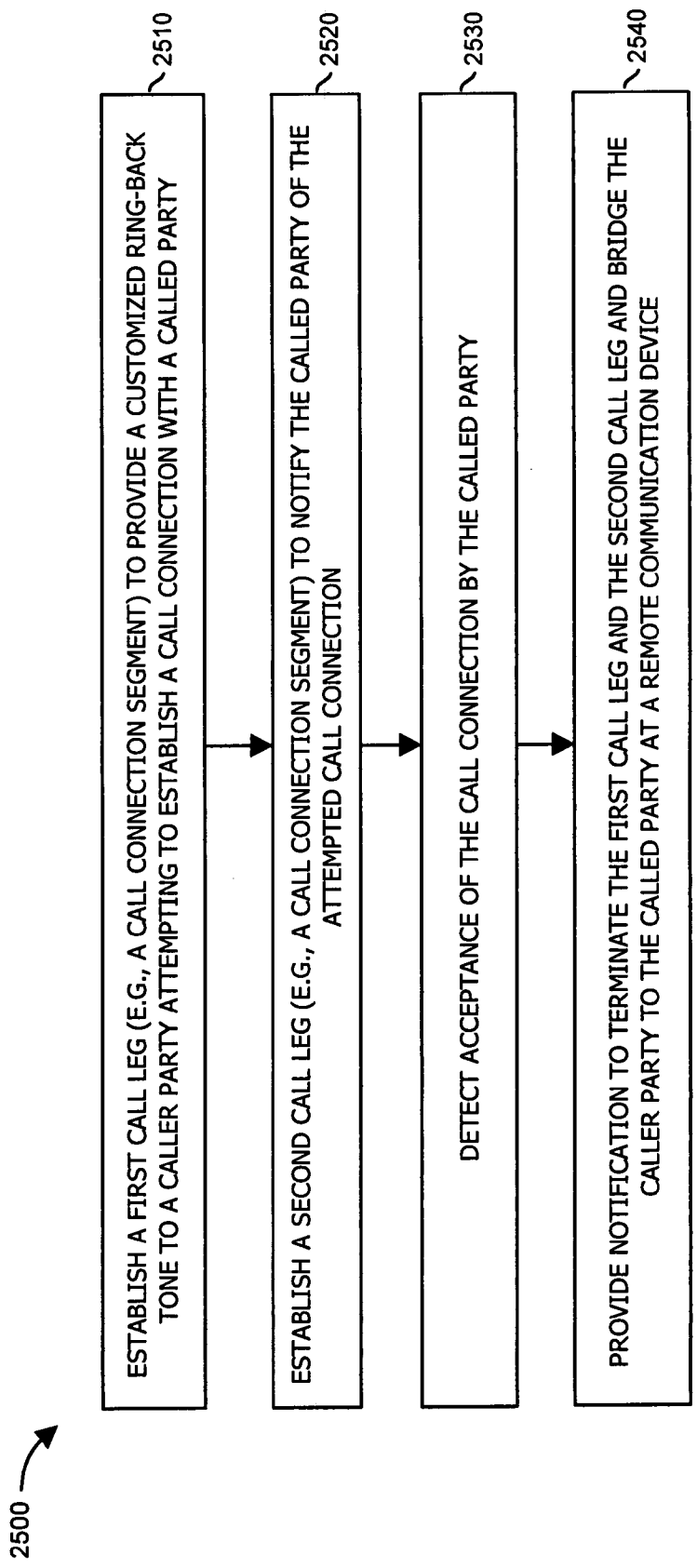

Now, more particularly, FIG. 5 is a flowchart 2500 illustrating a technique of implementing ring-back tone and related techniques (e.g., method, apparatus, etc.) according to embodiments herein. Note that techniques discussed in flowchart 2500 overlap with the techniques discussed above.

In step 2510, the ring-back tone generator system 2140 establishes a first call leg 2150-1 (e.g., a call connection segment) to provide a customized ring-back tone from ring-back tone generator system 2140 to a caller party (e.g., caller 2110) attempting to establish a call connection with a called party (e.g., target 2120 such as a phone, person, etc.).

In step 2520, the ring-back tone generator system 2140 establishes a second call leg 2150-2 (e.g., a call connection segment) to notify the called party (e.g., target 2120) of the attempted call connection initiated by caller 2110.

In step 2530, the ring-back tone generator system 2140 detects acceptance of the call connection request by the called party (e.g., target 2120) such as via a communication received over the second call leg 2150-2 from target 2120.

In step 2540, the ring-back tone generator system 2140 provides notification to terminate the first call leg 2150-1 and the second call leg 2150-2 and bridge the caller party (e.g., caller 2110) to the called party (e.g., target 2120) at a remote location (e.g., phone switch system 2130).

Figure 6:
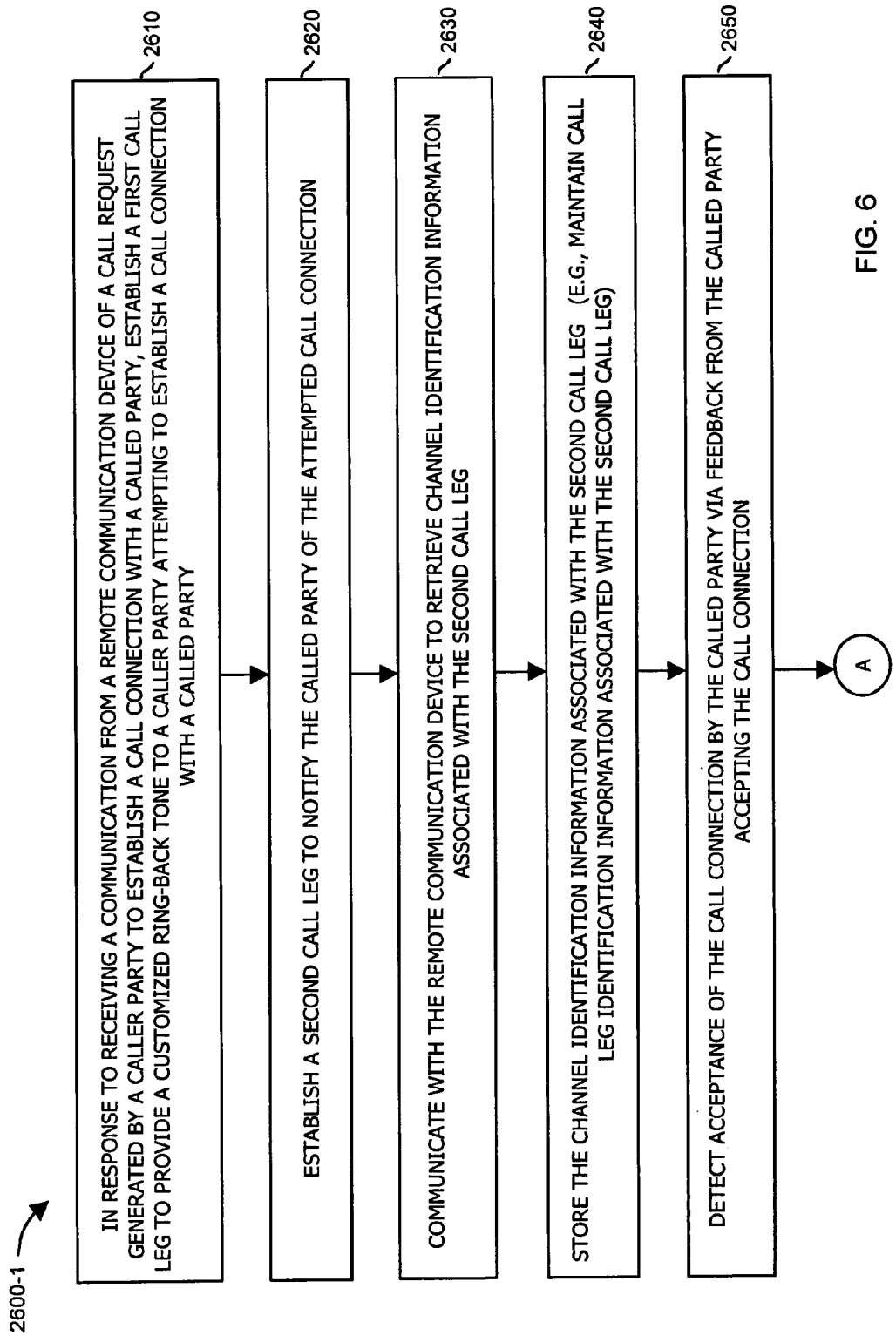
Figure 7:
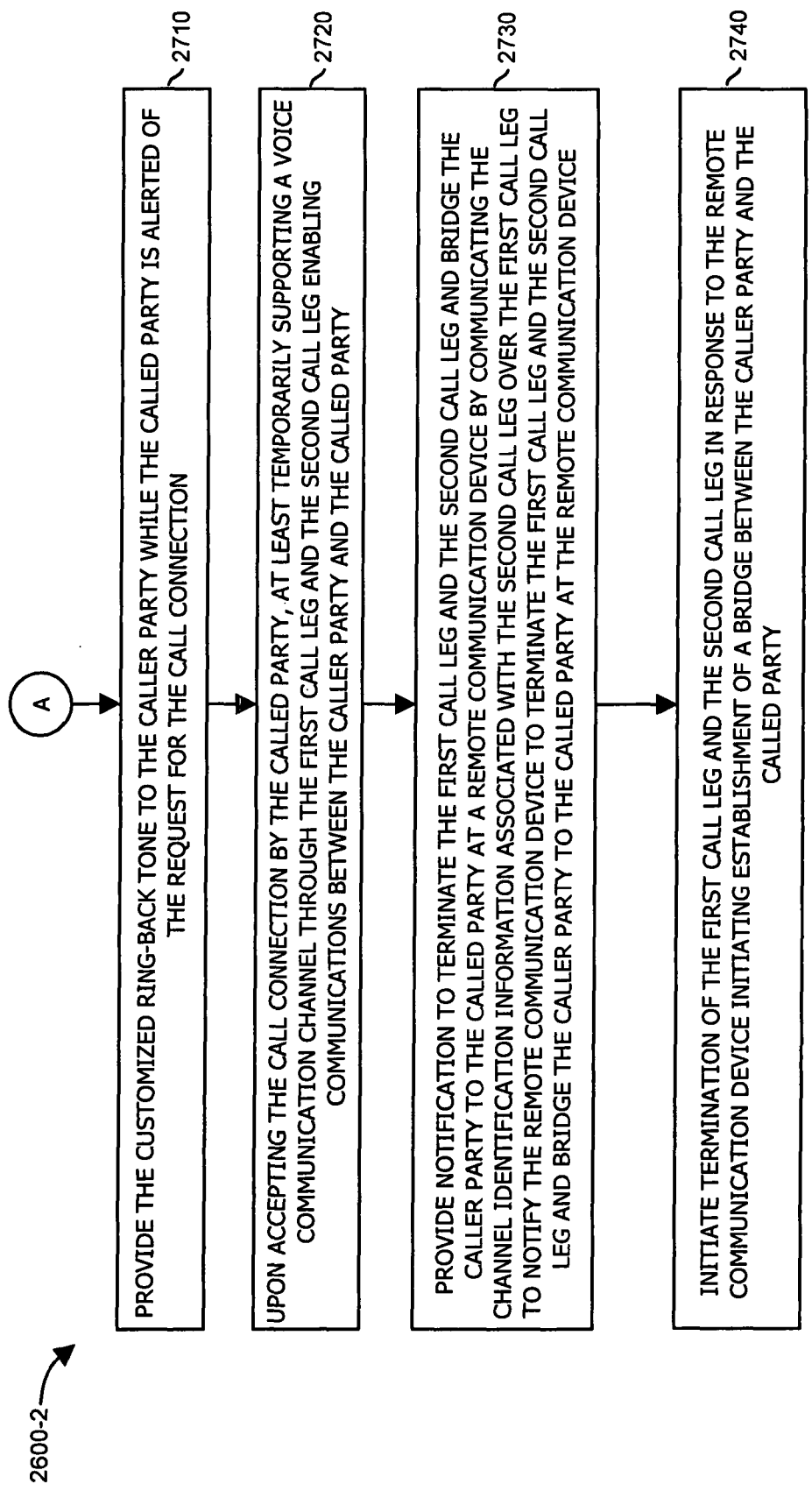

FIGS. 6 and 7 combine to form a detailed flowchart 2600 (e.g., flowchart 2600-1 and flowchart 2600-2) illustrating techniques for implementing customized ring-back tones and related processes according to embodiments herein. Note that techniques discussed in flowchart 2600 may overlap with the techniques discussed above in the previous figures.

In step 2610, in response to receiving a communication from a remote communication device (e.g., a phone device operated by caller 2110) of a call request generated by a caller party (e.g., caller 2110) to establish a call connection with a called party (e.g., target 2120), the ring-back tone generator system 2140 establishes a first call leg 2150-1 on which to provide a customized ring-back tone from ring-back tone generator system 2140 to the caller party.

In step 2620, the ring-back tone generator system 2140 establishes a second call leg 2150-2 to notify (e.g., alert) the called party 2110 of the attempted call connection.

In step 2630, the ring-back tone generator system 2140 communicates with a remote communication device (e.g., the phone switch system 2130) to retrieve channel identification information associated with the second call leg 2150-2. The channel identification information can specify attributes of the second call leg 2150-2 and/or specify information associated with the second call leg 2150-2 enabling an inquiring device to obtain information associated with the second call leg 2150-2.

In step 2640, the ring-back tone generator system 2140 stores the channel identification information associated with the second call leg 2150-2 (e.g., the ring-back tone generator system 2150-2 maintains call leg identification information associated with the second call leg).

In step 2650, the ring-back tone generator system 2140 detects acceptance of the call connection by the called party (e.g., target 2120) via feedback from the called party accepting the attempted call connection.

In step 2710 of flowchart 2600-2 of FIG. 27, the ring-back tone generator system 2140 provides (e.g., plays back) the customized ring-back tone to the caller party while the called party is alerted of the request for the call connection.

In step 2720, upon acceptance of the call connection by the called party, the ring-back tone generator system 2140 ends playback of the customized ring-back tone to the caller 2110, stops alerting the called party, and at least temporarily supports bridge 2146-2 and a voice communication channel through the first call leg 2150-1 and the second call leg 2150-2 enabling at least temporary communications between the caller party and the called party through the ring-back tone generator system 2140.

In step 2730, the ring-back tone generator system 2140 provides notification to phone switch system 2130 to terminate the first call leg 2150-1 and the second call leg 2150-2 and bridge the caller party to the called party at a remote communication device (e.g., phone switch system 2130), for example, by communicating the channel identification information associated with the second call leg 2150-2 over the first call leg 2150-1 to notify the remote communication device (e.g., phone switch system 2130) to terminate the first call leg 2150-1 and the second call leg 2150-2 and bridge the caller party to the called party at the phone switch system 2130.

In step 2740, the ring-back tone generator system 2140 participates in communication exchange with the phone switch system 2130 resulting in termination of the first call leg 2150-1 and the second call leg 2150-2 in response to the phone switch system 2130 initiating establishment of bridge 2236 at phone switch system 2130 between the caller party and the called party.

FIG. 8 is an example diagram of flowchart 2800 illustrating techniques in which the ring-back tone generator system 2140 at least temporarily provides a voice communication bridge (e.g., bridge 2146-2) and attempts (e.g., performs a looping procedure) to establish bridge 2236 at phone switch system 2130) according to embodiments herein. Note that techniques discussed in flowchart 2800 may overlap with the techniques discussed above in the previous figures.

In step 2810, the ring-back tone generator system 2140 provides a voice communication channel through a first call leg 2150-1 and a second call leg 2150-2 enabling communications between a caller and a target destination (e.g., called party). This was described in step 2720 of flowchart 2600-2.

In step 2820, assume in this example that the ring-back tone generator system 2140 initiates transmission of an initial request to a remote communication device (e.g., phone switch system 2130) to establish a call connection bridge 2236 at the phone switch system 2130 connecting the caller party and the called party.

In step 2830, assume that the ring-back tone generator system 2140 currently detects an inability of the phone switch system 2130 to establish the call connection bridge 2236 at the phone switch system 2130.

In step 2840, the ring-back tone generator system 2140 continues to provide bridge 2146-2 and the voice communication channel through the first call leg 2150-1 and the second call leg 2150-2 enabling communications between the caller 2110 and the target (e.g., called party).

In step 2850, the ring-back tone generator system 2140 initiates transmission of a subsequent request to the phone switch system 2130 to establish the call connection bridge 2236.

In step 2860, assume that the ring-back tone generator system 2140 now detects an ability of the phone switch system 2130 (e.g., based on a response from the phone switch system 2130) to establish the call connection bridge 2236. The phone switch system 2140 then creates bridge 2236 to connect the caller 2110 to the target 2120.

In step 2870, during, around, and/or after establishment of bridge 2236, the ring-back tone generator system 2140 initiates termination of the bridge 2146-2 as well as the first call leg 2150-1 and the second call leg 2150-2 and corresponding voice communication channel. Accordingly, the caller and the called party can communicate via a voice call handling through bridge 2236.

Figure 9:
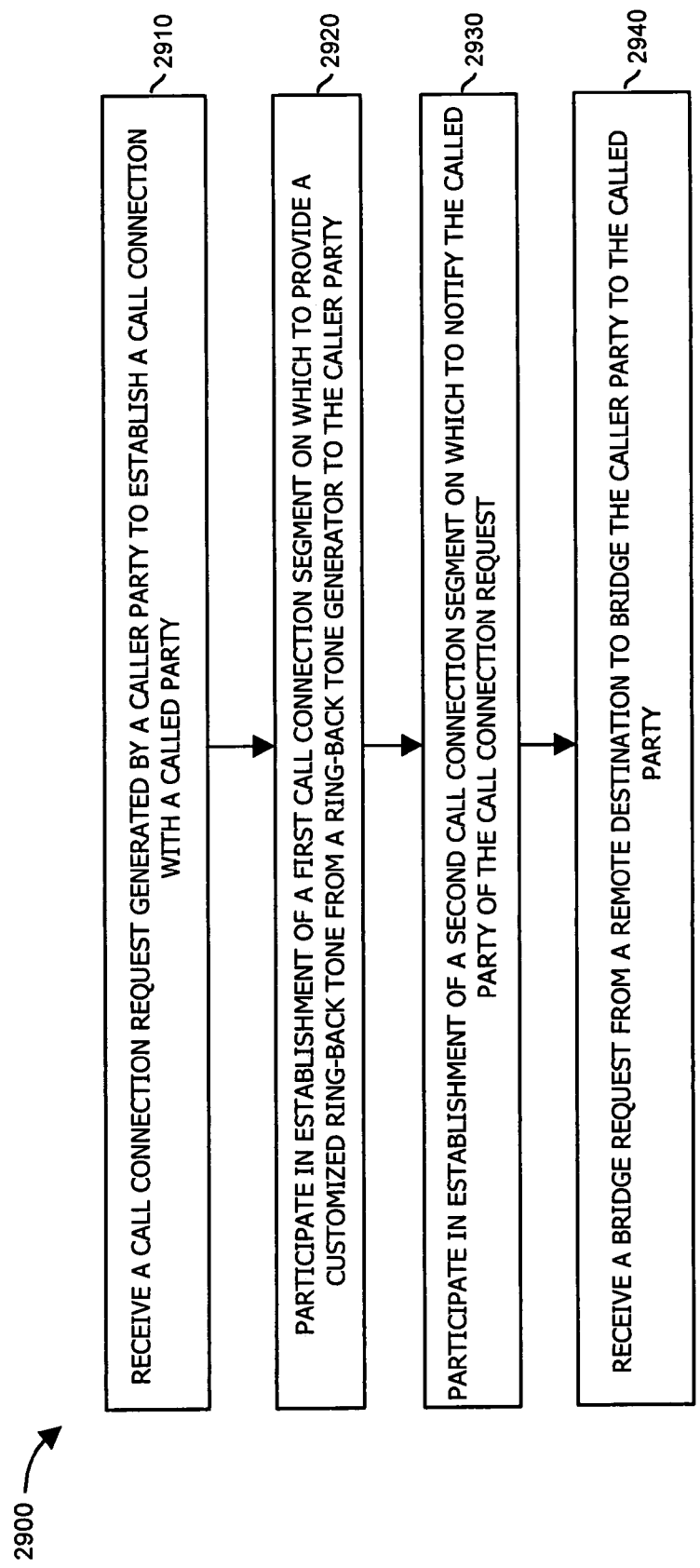

FIG. 9 is an example diagram of flowchart 2900 illustrating techniques associated with phone switch system 2130 according to embodiments herein. Note that techniques discussed in flowchart 2900 may overlap with the techniques discussed above in the previous figures.

In step 2910, the phone switch system 2130 receives a call connection request generated by a caller 2110 to establish a call connection with a called party (e.g., target 2120).

In step 2920, the phone switch system 2130 participates in establishment of a first call connection segment (e.g., call connection leg 2150-1) on which to provide a customized ring-back tone from a ring-back tone generator 2140 to the caller 2110.

In step 2930, the phone switch system 2130 participates in establishment of a second call connection segment (e.g., call connection leg 2150-2) on which to notify the called party (e.g., target 2120) of the call connection request.

In step 2940, the phone switch system 2130 receives a bridge request from ring-back tone generator system 2140 (e.g., a resource at a remote destination) to bridge the caller 2110 to the called party.

Figure 10:
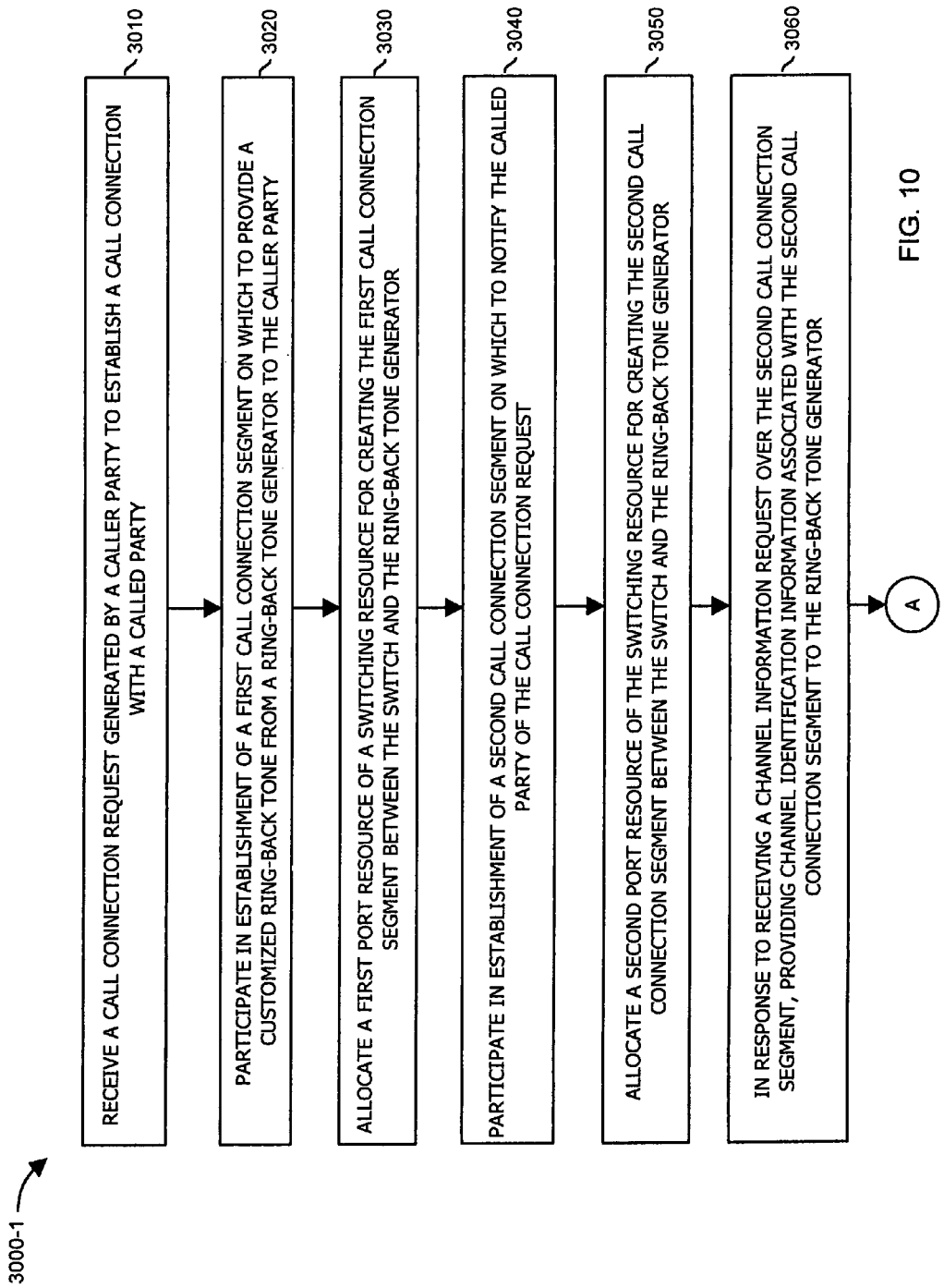
Figure 11:
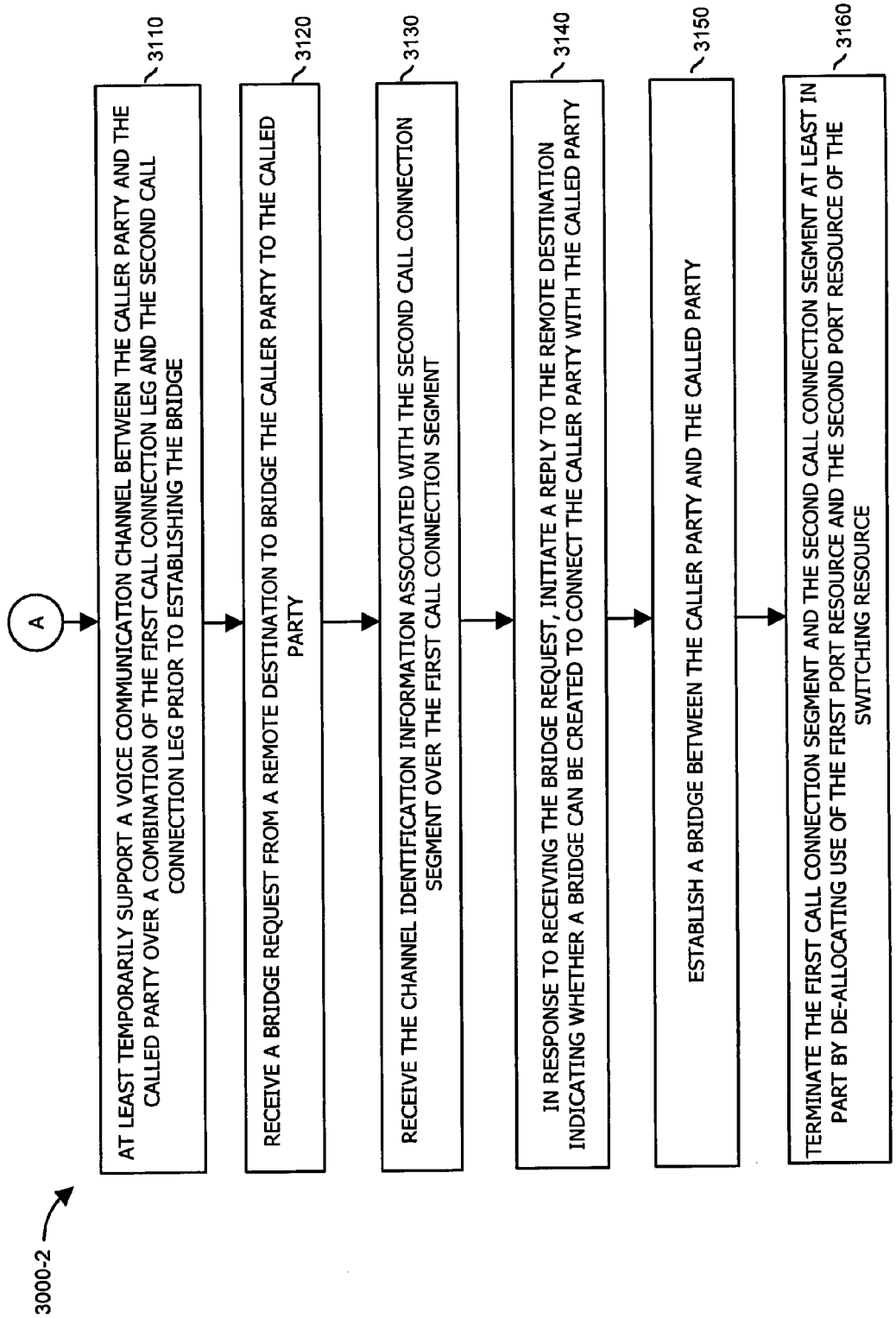

FIGS. 10 and 11 combine to form flowchart 3000 (e.g., flowchart 3000-1 and flowchart 300-2) illustrating techniques associated with communication system 2100 according to embodiments herein. Note that techniques discussed in flowchart 3000 may overlap with the techniques discussed above in the previous figures.

In step 3010 in flowchart 3000-1 of FIG. 10, the phone switch system 2130 receives a call connection request generated by a caller 2110 to establish a call connection with a target 2120.

In step 3020, the phone switch system 2130 participates in establishment of a first call connection leg (e.g., segment) on which to provide a customized ring-back tone from a ring-back tone generator 2140 to the caller 2110.

In step 3030, the phone switch system 2130 allocates a port resource 2132-2 (e.g., of a switching resource) for creating the first call connection leg 2150-1 between the phone switch system 2130 and the ring-back tone generator 2140.

In step 3040, the phone switch system 2130 participates in communications with the ring-back tone generator system 2140 to establish a second call connection leg 2150-2 that is used to notify the called party of the call connection request In step 3050, based on communications with the ring-back tone generator system 2140, the phone switch system 2130 allocates a second port resource 2132-3 of phone switch system 2130 (e.g., a switching resource) for creating the second call connection segment between the phone switch system 2130 and the ring-back tone generator system 2140.

In step 3060, in response to receiving a channel information request (e.g., a request for information associated with the first call connection leg 2150-1) over the second call connection leg 2150-2, the phone switch system 2130 provides channel identification information associated with the second call connection leg 2150-2 to the ring-back tone generator 2140.

In step 3110 in flowchart 3000-2 of FIG. 11, via bridge 2146-2 in ring-back tone generator system 2140, the phone switch system 2130 at least temporarily participates as an intermediary and supports a voice communication channel between the caller 2110 and the target 2120 over a combination of the first call leg 2150-1 and the second call connection leg 2150-2 prior to establishing the bridge 2236 in the phone switch system 2130.

In step 3120, assume that the phone switch system 2130 receives a bridge request from the ring-back tone generator system 2140 (e.g., a remote destination) to bridge the caller 2110 to the target 2120. For example, assume that the subscriber at target 2120 answers his phone causing the ring-back tone generator system 2140 to communicate over the first call connection leg 2150-1 that the phone has been answered.

In step 3130, in addition to notifying the target that the target answers the phone, the phone switch system 2130 receives (from the ring-back tone generator system 2140) channel identification information associated with the second call connection leg 2150-2 over the first call connection leg 2150-1.

In step 3140, in response to receiving the bridge request from a source such as ring-back tone generator system 2140, the phone switch system 2130 initiates a communication to the ring-back tone generator system 2140 indicating whether a bridge can be created at the phone switch system 2130 to connect the caller party with the called party.

In step 3150, assuming the phone switch system 2130 can create bridge 2236 and provides such a message in step 3140, the phone switch system 2130 establishes bridge 2236 at phone switch system 2130 to connect the caller party and the called party eliminating the need for bridge 2146-2 at ring-back tone generator system 2140.

In step 3160, the phone switch system 2130 initiates termination of the first call connection leg 2150-1 and the second call connection leg 2150-2 at least in part by de-allocating use of the first port resource 132-2 and the second port resource 132-3 at the phone switch system 2130 as specified by the call handling identification information.

Figure 12:
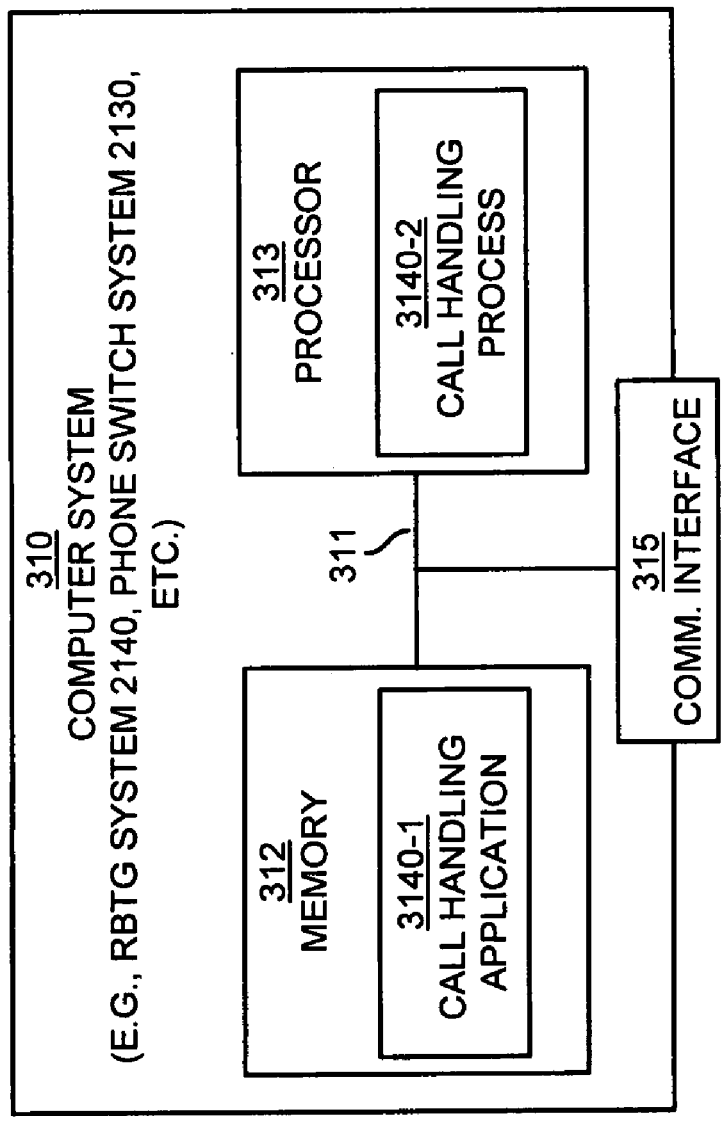
FIG. 12 is a diagram of an example architecture for carrying out processes, methods, etc. according to embodiments herein.

FIG. 12 is a block diagram illustrating an example computer system 310 for executing software instructions according to embodiments herein. Computer system 310 (e.g., hardware and/or software in ring-back tone generator system 2140, phone switch system 2130, etc.) may be a computerized device for providing corresponding call handling functions as described herein.

As shown, computer system 310 of the present example includes an interconnect 311 that couples resources such as a memory system 312, a processor 313, and a communications interface 315. Memory system 312 can be encoded with a call handling application 3140-1 supporting embodiments as described herein. For example, the call handling application 3140-1 can be embodied as software code such as data and/or logic instructions (e.g., code stored in the memory or on another computer readable medium such as a disk) that support functionality according to different embodiments described herein such as those supported by ring-back tone generator system 2140 and phone switch system 2130.

During operation of call handling application 3140-1, processor 313 accesses memory system 312 via the interconnect 311 in order to launch, run, execute, interpret or otherwise perform the logic instructions associated with the call handling application 3140-1. Execution of the call handling application 3140-1 produces processing functionality in call handling process 3140-2. In other words, the call handling process 3140-2 represents one or more portions of the call handling application 3140-1 (or the entire application) performing within or upon the processor 313 in the computer system 310.

It should be noted that call handling process 3140-2 executed in computer system 310 can be represented by either one or both of the call handling application 3140-1 and/or the call handling process 3140-2. For purposes of this discussion and different embodiments herein, general reference will again be made to the call handling process 3140-2 as performing or supporting the various steps and functional operations as previously discussed in flowcharts and other text herein.

As mentioned, in addition to the call handling process 3140-2, embodiments herein include the call handling application 3140-1 itself (i.e., the un-executed or non-performing logic instructions and/or data). The call handling application 3140-1 may be stored on a computer readable medium such as a floppy disk, hard disk, or optical medium. The call handling application 3140-1 may also be stored in a memory type system such as in firmware, read only memory (ROM), or, as in this example, as executable code within the memory system 312 (e.g., within Random Access Memory or RAM). In addition to these embodiments, it should also be noted that other embodiments herein include the execution of call handling application 3140-1 in processor 313 as the call handling process 3140-2. Thus, those skilled in the art will understand that the computer system 310 may include other processes and/or software and hardware components, such as an operating system that controls allocation and use of hardware resources.

Figure 13:
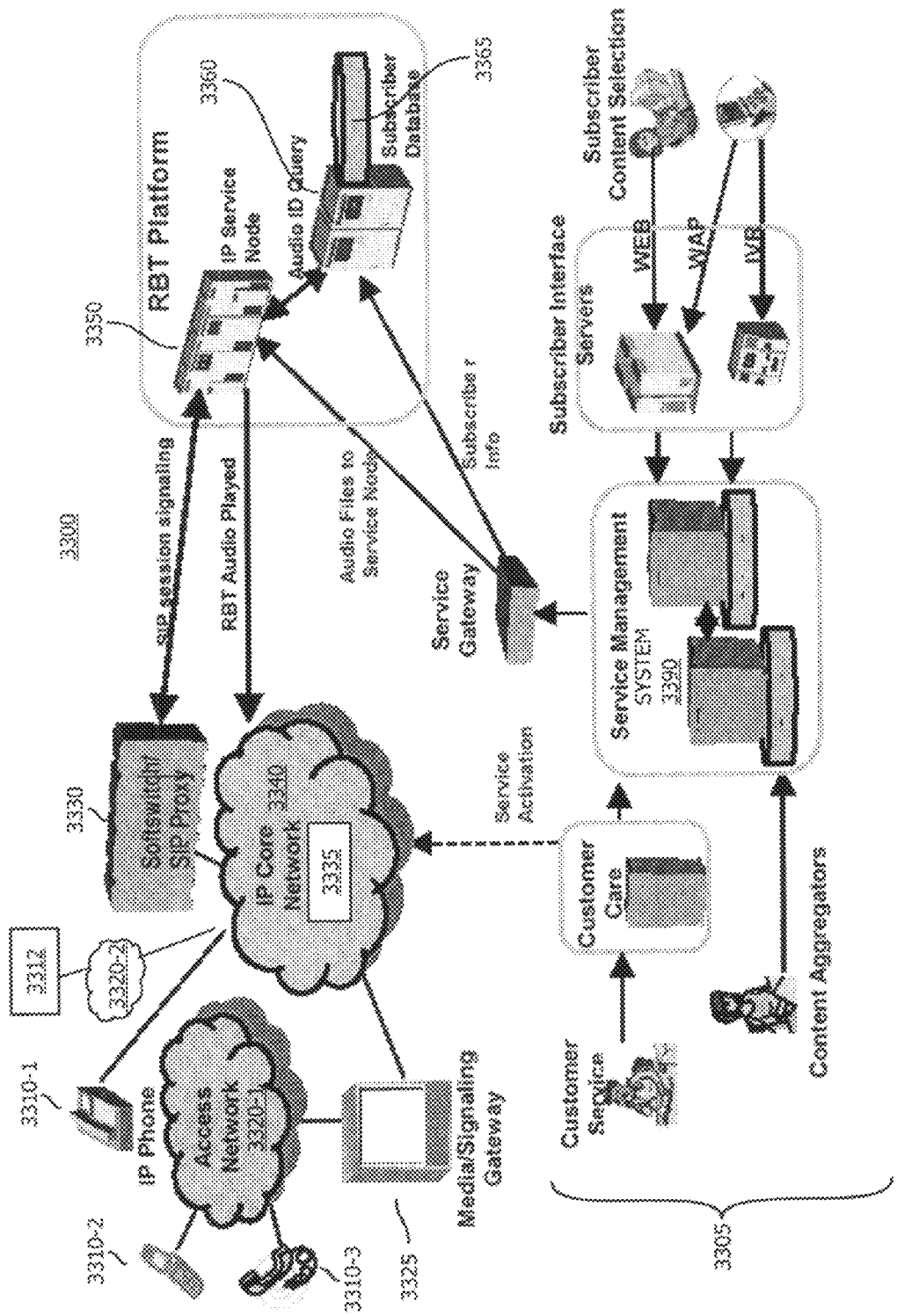
FIG. 13 is an example diagram of a IP network supporting customized ring-back tones according to embodiments herein.

FIG. 13 is an example diagram of a network environment 3300 (e.g., a packet-switched network and corresponding resources) and IP service node implementation and/or application server supporting customized ring-back tones according to embodiments herein. The following disclosure includes a description of equipment, methods, etc. for providing a ring-back tone service (e.g., RBT service) in an Internet protocol (IP) based network, such as a voice over IP (VoIP) network or the evolving IP Multimedia Subsystem (IMS).

In network environment 3300 as shown in FIG. 33, user devices (e.g., as operated by caller 3310) may be native IP devices (i.e., VOIP phones) and/or traditional PSTN phones/cellular handsets connected via an access network through gateway 3325 (e.g., media and/or signaling gateway) to core network 3340 (e.g., an IP core network or packet-switched network). Access networks 3320 (e.g., access network 3320-1, access network 3320-2, . . . ) can be used to connect the user devices (e.g., caller and/or called parties) to core network 3340. For example, access network 3320-1 enables caller 3310-2 (e.g., a cellular phone users) and caller 3310-3 (e.g., a PSTN phone user) to place calls to a target destination such as called party 3312. Gateway 3325 converts signals received from cellular phones or PSTN phones to data packets for transmission over core network 3340. Accordingly, callers and called destinations can be any combination of cellular phone users, landline users, broadband users, or cellular phone users.

In one embodiment, core network 3340 includes a call handler system (e.g., an IP service node, media player for play back of ring-back tones, and a subscriber database for storing information of each subscriber's ring-back tones, etc.). Thus, as will be further discussed in this disclosure, the call handler system 3350 can include: i) a back-to-back (B2B) SIP user agent for communicating call signaling information between a calling user agent (e.g., softswitch or gateway 3330) and a called user agent (e.g., the same or different softswitch or gateway), ii) a media player 3360 capable of playing the RBT audio (and/or custom video image data) to the caller over the IP network (e.g., via RTP), and iii) a subscriber database 3365 holding subscription information (purchased/available audio (and/or custom video image data) files, group lists, subscriber preferences and which ring-back tone to play for a given caller, etc).

Note that network environment 3300 can include resources 3305 such as service management system 3390 enabling corresponding subscribers to select different ring-back tones to be played back for future calls to the subscriber.

In general, incoming calls for RBT subscribers (e.g., ring-back tone subscribers or, more specifically, called parties that subscribe to a service for playing customized ring-back tones to corresponding callers) such as incoming calls generated by caller 3310 (e.g., a PSTN phone, a cellular phone, a VOIP phone, etc.) are routed by the controlling softswitch or SIP proxy server (e.g., resource 3330) to the call handler system 3350.

The call handler system 3350 can act as both a SIP user agent server (UAS) on behalf of the caller and a user agent client (UAC) initiating a new session to the called subscriber on behalf of the caller 3310. In one embodiment, the call handler system (e.g., service node) remains in the signaling path for the duration of the call, receiving signaling messages from each party and relaying the appropriate message to the other party. In other embodiments, the call handler system 3350 provides an appropriate ring-back tone to a caller and, after a call has been accepted by a called party, the call handler system 3350 drops out of the call so that the caller and called destination communicate directly with each other rather than through the call handler system 3350.

Figure 14:
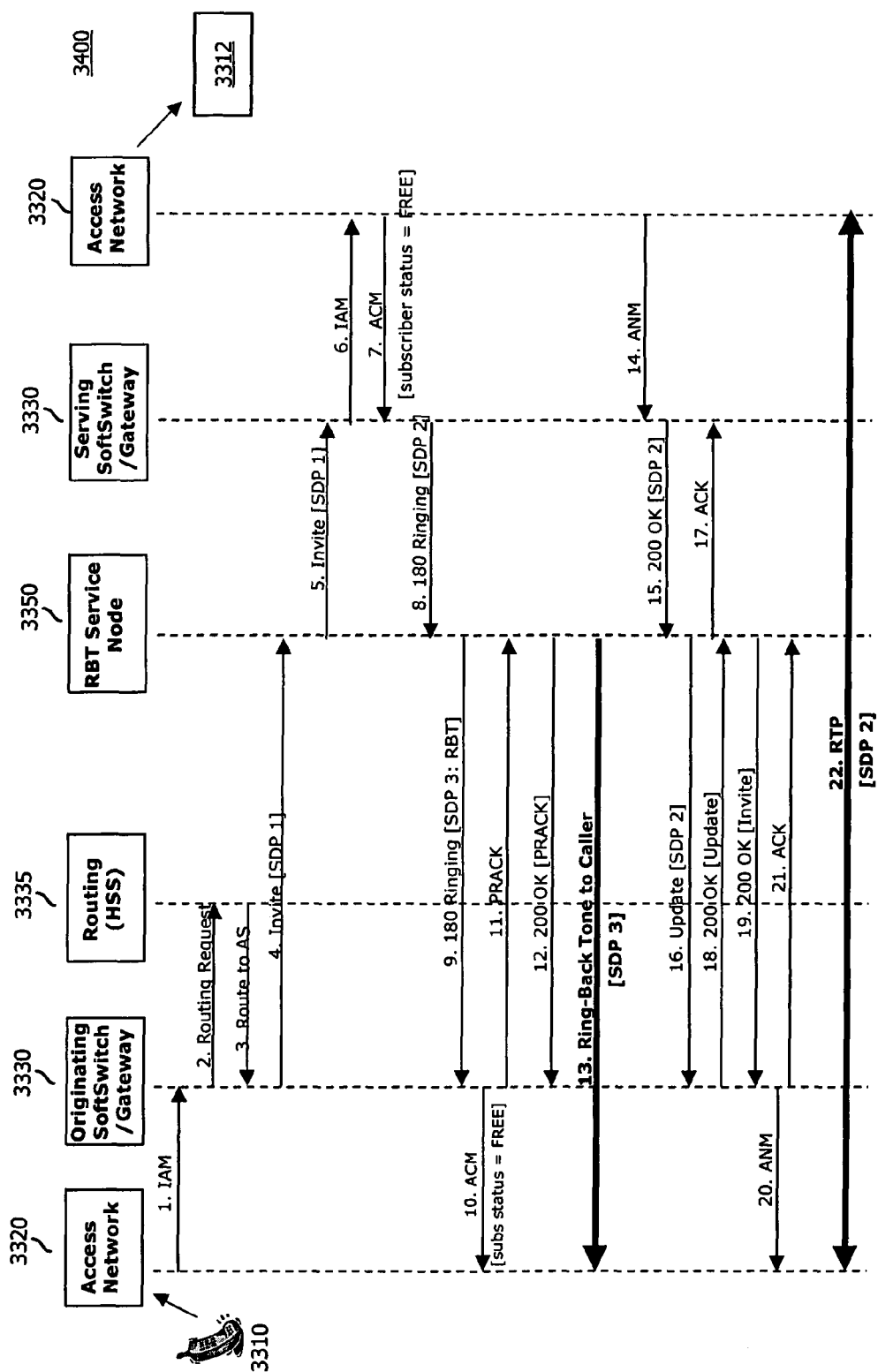
FIG. 14 is an example timing diagram illustrating a technique of providing customized ring-back tones in a packet-switched network according to embodiments herein.

FIG. 14 is an example timing diagram 3400 illustrating a technique of providing customized ring-back tones in a packet-switched network according to embodiments herein. For example, timing diagram 3400 illustrates receipt of a call connection request arriving at the IP network (softswitch/signaling gateway) from the same or different access type. IP network processing is similar for calls to/from native IP devices.

Steps Description 1-4 An incoming call arrives at the IP network (e.g., network 3340) and originating softswitch determines call disposition (e.g., by querying the HSS 3335 in an IMS network).

Assume in this example that the call is to an RBT subscriber. The HSS 3335 provides information associated with the subscriber being called. Information accessed from the HSS 3335 indicates that the call request should be redirected to the call handler system 3350. The session characteristics (SDP 1 information) requested by the caller/gateway are passed to the call handler system 3350. The session characteristics provided by the caller can include information such as multiple possible encoding formats (e.g., a CODEC, compression type, encryption, etc.) that are acceptable for communicating with the caller 3310.

5-6 The call handler system 3350 (e.g., RBT service node) creates a new phone session directed towards the called subscriber (e.g., called destination), passing the session description information (SDP 1 and/or the list of acceptable encoding formats) received from the caller to the called subscriber. Accordingly, the called party is notified of the call connection request initiated by the caller as well as the different possible encoding formats for communicating information to the caller. If the called subscriber is not an IP-native device, the serving gateway offers the call to the subscriber in its native signaling mode (e.g., SS7 ISUP).

Steps Description 7-8 The call handler system 3350 (e.g., RBT service node) receives an indication that the called subscriber is alerted of the incoming call placed by the caller 3310. The information conveyed from the called destination 3312 back to the call handler system 3350 can include the call session parameters accepted by the called party for this call (SDP 2). For example, the called destination chooses one of multiple encoding formats and/or session parameters as received from the caller 3310. The call handler system 3350 stores the SDP 2 session parameters for future use. In addition to selecting session parameters such as a CODEC, compression-type, etc., the called destination 3312 can provide an IP address and port number information for the called party's phone associated with the session.

9-12 The call handler system 3350 sends an SIP 180 ringing indication to the caller to indicate that the called destination has been alerted of the call request. Signaling to the caller can include transmission of corresponding session parameters to be used by the call handler system 3350 (e.g., RBT service node) for playing the ring-back tone audio (and/or custom video image data) content (SDP 3) rather than the session parameters selected by the called party to communicate with the caller in steps 7-8.

13 At this point, the call handler system 3350 initiates playback of the appropriate ring-back (and/or custom video image data) tone to the caller party depending on information specified by the subscriber prior to the call.

Steps Description 14-17 The call handler system receives an indication that the call is answered and sends an UPDATE message to the caller to change the session parameters to the previously stored session parameters of the called subscriber (SDP 2). Accordingly, if the session parameters selected by the called destination are different that the session parameters used to convey the ring-back tone to the caller, the call handler system re-negotiates or notifies the caller of the new session parameters for the next portion of the call. The call handler system 3350 may choose uncompressed G711 format to send the ring-back tone to the caller 3310 while the called destination may select G729 compressed voice for the two-way voice communication associated with the call because the called destination 3312 may only support a low bandwidth session. Accordingly, the call handler system 3350 can play back a custom ring-back tone at a high audio resolution while final voice communications (as in step 22 below) can be maintained at a lower audio resolution. In such an instance, the ring-back tone played back to the caller 3310 will be a higher quality audio signal than that of the called party's voice conveyed to the caller 3310.

18-21 After the caller acknowledges the new session parameters, the answer indication is forwarded to the caller 3310.

22 Finally, the call handler system 3350 drops out of the call enabling the caller and called destination to communicate over a network path (e.g., an audio channel) connecting the caller and called subscriber through core IP network 3340. For example, the call handler system 3350 can notify the caller and the called party of each other's network addresses for direct communications.

Figure 15:
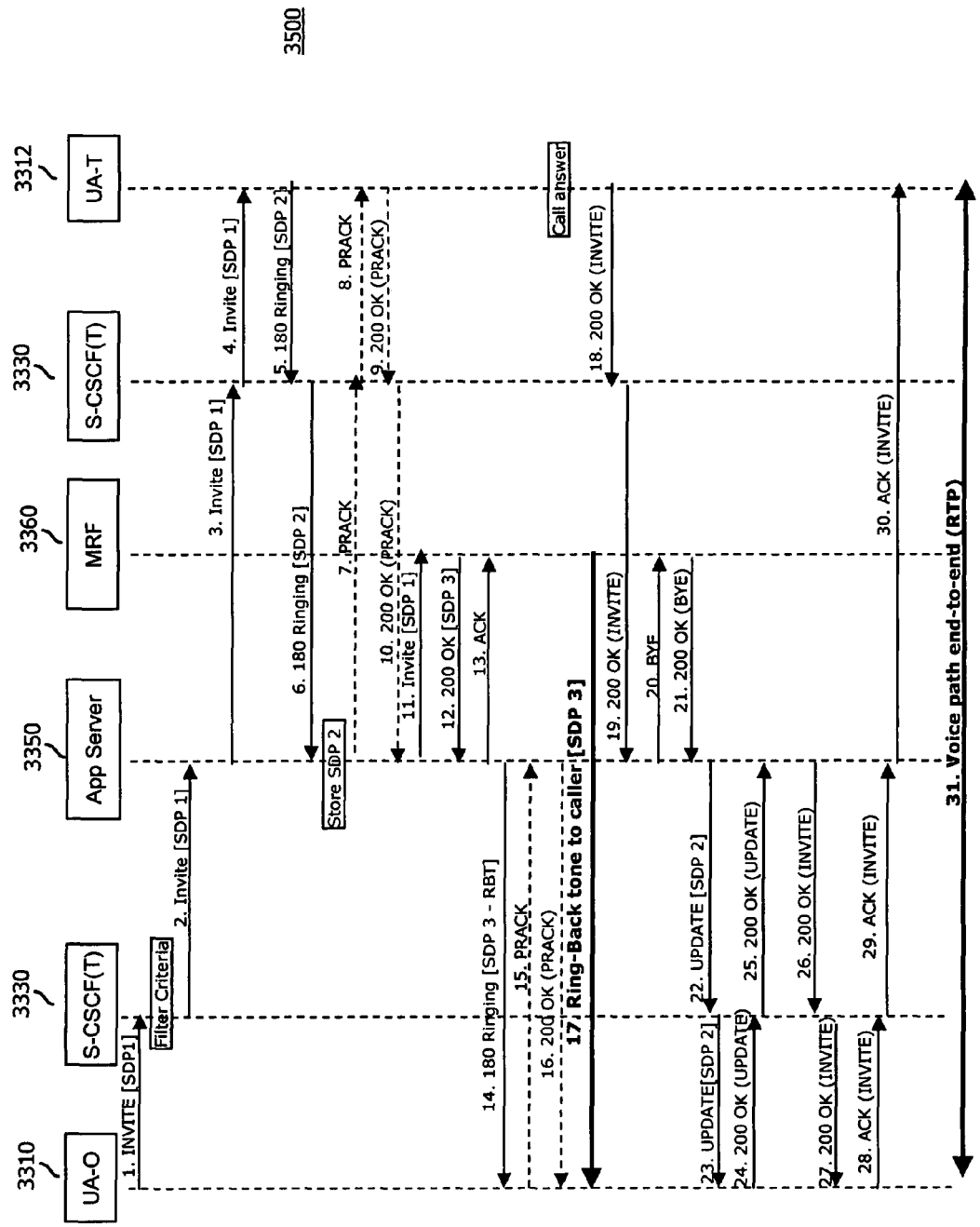
FIG. 15 is an example timing diagram illustrating a technique of providing customized ring-back tones in a packet-switched network according to embodiments herein.

FIG. 15 is an example timing diagram 3500 illustrating a technique of providing customized ring-back tones in network environment 3300 according to embodiments herein.

IP Application Server Operation

In one embodiment, the IP application server implements two separate network nodes to implement the ring-back tone service according to embodiments herein. For example, the call handler system 3350 can be a first node such as an application server. The application server can be a standard computing platform with one or more IP network interfaces and a SIP protocol layer capable of operating as a SIP back-to-back user agent. The application server can contain the RBT service subscriber data or have access to a separate node (e.g., IMS home subscriber server such as HSS 3335) containing the subscriber data.

A second node such as media player system 3360 (e.g., media resource function, MRF) can contain or have access to all the ring-back tone media content stored in database 3365. The interface between the application server (e.g., call handler system 3350) and the MRF (e.g., media player system 3360 and database 3365) can be a SIP interface. The call handler system 3350 can be collocated with the media player system 3360 or, alternatively, the media player system 3360 and the call handler system 3350 can be located apart form each other over a network. The MRF can be shared between the ring-back tone application and other services requiring storage or play back of media resources.

Timing diagram 3500 in FIG. 15 illustrates the basic operation of the RBT application server (e.g., call handler system 3350) in an IP network (e.g., network environment 3300). The UA-O (e.g., caller IP phone or caller's IP access gateway associated with the caller phone) and UA-T (e.g., called party IP phone or called party's IP gateway) in the timing diagram 3500 are the originating and terminating user agents. The agents can be SIP-enabled endpoints or gateways to other types of access networks. The S-CSCF(T) (e.g., proxy 3330) is the terminating IMS call state control function (e.g., softswitch or MSC server) and has been shown twice to illustrate one operable embodiment. Note that the terminating IMS call state control function can be located at a different location than the IMS call state control function in other embodiments.

Steps Description 1-2 The incoming call request arrives at the IP network from the IP phone or a gateway. In the context of the present example, upon receipt of the call request or call notification, the terminating S-CSCF (e.g., proxy 3330) determines that the called party is a ring-back tone subscriber and applies appropriate filter criteria to identify which server should forwarded the incoming call request. The proxy redirects the SIP invite to the call handler system 3350 (e.g., a selected ring-back tone application server). The call handler system 3350 receives session characteristics (e.g., SDP 1) associated with the call connection request from the gateway of corresponding IP phone (e.g., caller 3310). As discussed above, the caller can specify a number of different encoding options, compression formats, etc. The call handler system 3350 stores this information associated with the caller.

3-4 The call handler system 3350 (e.g., RBT AS) creates a new session between the call handler system 3350 and the called destination (e.g., called party). The call handler system 3350 passes the session description information (e.g., SDP 1) received from the caller to the called destination 3312 (e.g., a ring-back tone subscriber). For example, the called party is notified of the call connection request initiated by the caller as well as the different possible encoding formats, compression formats, etc. (e.g., session parameters) for communicating information to the caller 3310 as provided by the caller 3310.

5-10 The call handler system 3350 receives an indication that the called destination 3312 is alerted of the incoming call connection request initiated by the caller 3310. The response from the called destination is includes the session parameters accepted by the called party for this call (SDP 2). In other words, the called destination 3312 selects a session format (e.g., encoding option, compression option, etc.) for communicating with the caller. The call handler system 3350 stores the SDP 2 session parameters as specified by the called destination 3312 for future use.

Steps Description 11-13 To provide a ring-back tone service to the caller 3310, the call handler system 3350 initiates a session with media player system 3360 (e.g., MRF). In this step the call handler system 3350 passes an identifier of a desired ring-back tone audio (and/or custom video image data) clip(s) to be played back to the caller as well as the SDP 1 information (e.g., call communication options such as encoding options, compression options, etc.) associated with the incoming call from caller 3310. The media player system 3360 selects a call communication format for playing back the appropriate ring-back tone to the caller 3310. The media player system notifies the call handler system 3350 of its selected session description (SDP 3) for communicating with the caller 3310.

14-16 The call handler system 3350 (e.g., AS) sends a SIP 180 ringing indication to the caller 3310. This signaling can include the session parameters (e.g., SDP 3 information) as selected by the media player system (e.g., MRF) for playing the ring-back tone audio (and/or custom video image data) signal to the caller 3310. Note that the communication option selected by the media player system 3360 can be different than communication option/format selected by the called destination 3312.

17 While waiting for the subscriber (e.g., called destination 3312) to answer his phone, the media player system 3360 initiates play back of the ring-back tone to the caller 3310.

18-21 Upon receipt of an indication that the call is answered by called destination 3312, the call handler system notifies the media player system 3360 to discontinue playing the ring-back tone to the caller 3310.

22-25 The call handler system 3350 then sends an UPDATE message to the caller 3310 to change the session parameters to the previously stored session parameters as selected by the called subscriber (SDP 2) in steps 5 and 6.

Steps Description 26-30 The caller 3310 notifies (e.g., via an acknowledgment message) the call handler system 3350 of receipt of the new session parameters (e.g., SDP 2 information). The call handler system 3350 forwards the answer indication to the caller 3310, which confirms receipt.

31 The call handler system 3350 drops out of the call, enabling direct communications over a packet-switched network between the caller 3310 and called subscriber 3312. In one embodiment, the call handler system 3350 notifies the caller 3310 of the IP address associated with the called destination 3312 and notifies the called destination 3312 of the IP address associated with the caller 3310 for supporting such a link between the caller 3310 and the called destination 3312.

Functionality supported by network environment 3300 and, more specifically, a resource such as call handler system 3350 of FIG. 13 will now be discussed via flowcharts in FIGS. 16-20.

Figure 16:
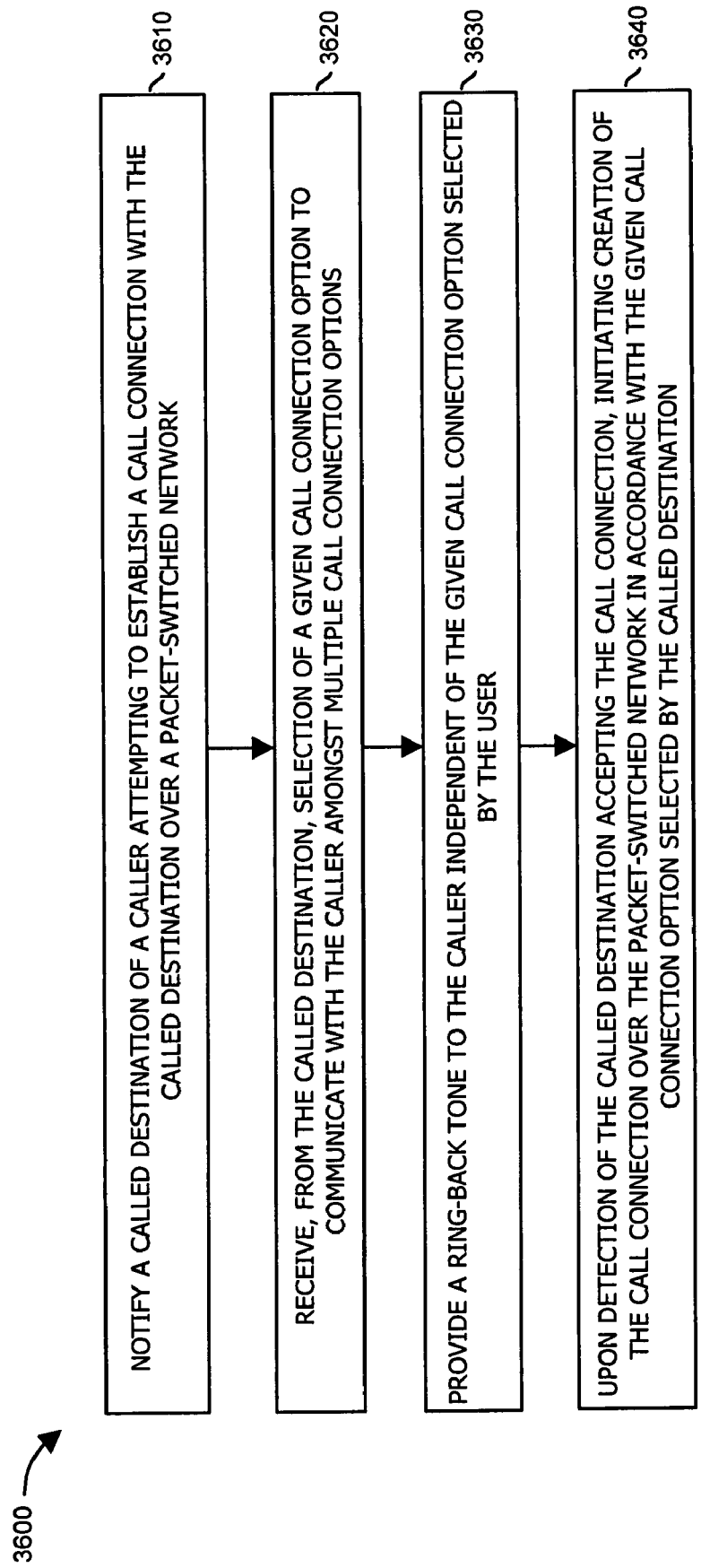
FIGS. 16-20 are diagrams of example flowcharts according to embodiments herein.

For example, FIG. 16 is a flowchart 3600 illustrating a technique of implementing ring-back tone and related techniques (e.g., method, apparatus, etc.) in network environment 3300 according to embodiments herein. Note that techniques discussed in flowchart 3600 overlap with the techniques discussed above.

In step 3610, the call handler system 3350 notifies a called destination 3312 of a caller 3310 attempting to establish a call connection with the called destination 3312 over a packet-switched network (e.g., core network 3340).

In step 3620, the call handler system 3350 receives, from the called destination 3312, selection of a given call connection option (e.g., an encoding format, compression format, etc.) to communicate with the caller 3310 amongst multiple possible call connection options.

In step 3630, the call handler system 3350 provides a ring-back tone to the caller 3310 independent of the given call connection option selected by the called destination 3312. For example, the called destination 3312 may select a first encoding format for communicating with the caller 3310 while the call handler system 3350 (or media player system 3360) selects a second encoding format on which to provide the ring-back tone to the caller 3310.

In step 3640, upon detection of the called destination 3312 accepting the call connection, the call handler system 3350 initiates creation of the call connection over the packet-switched network (e.g., core network 3340) in accordance with the given call connection option selected by the called destination 3312.

Figure 17:
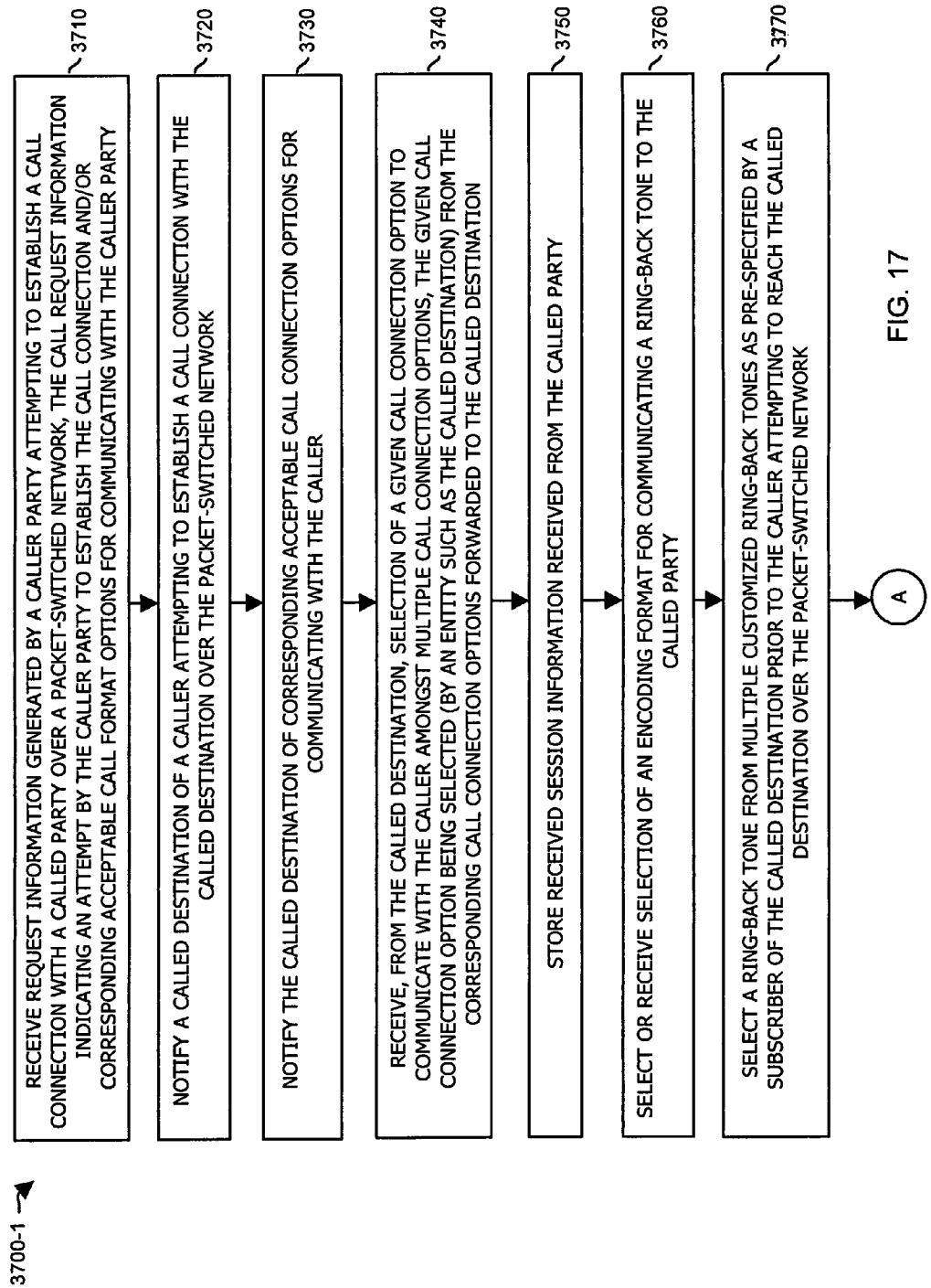
Figure 18:
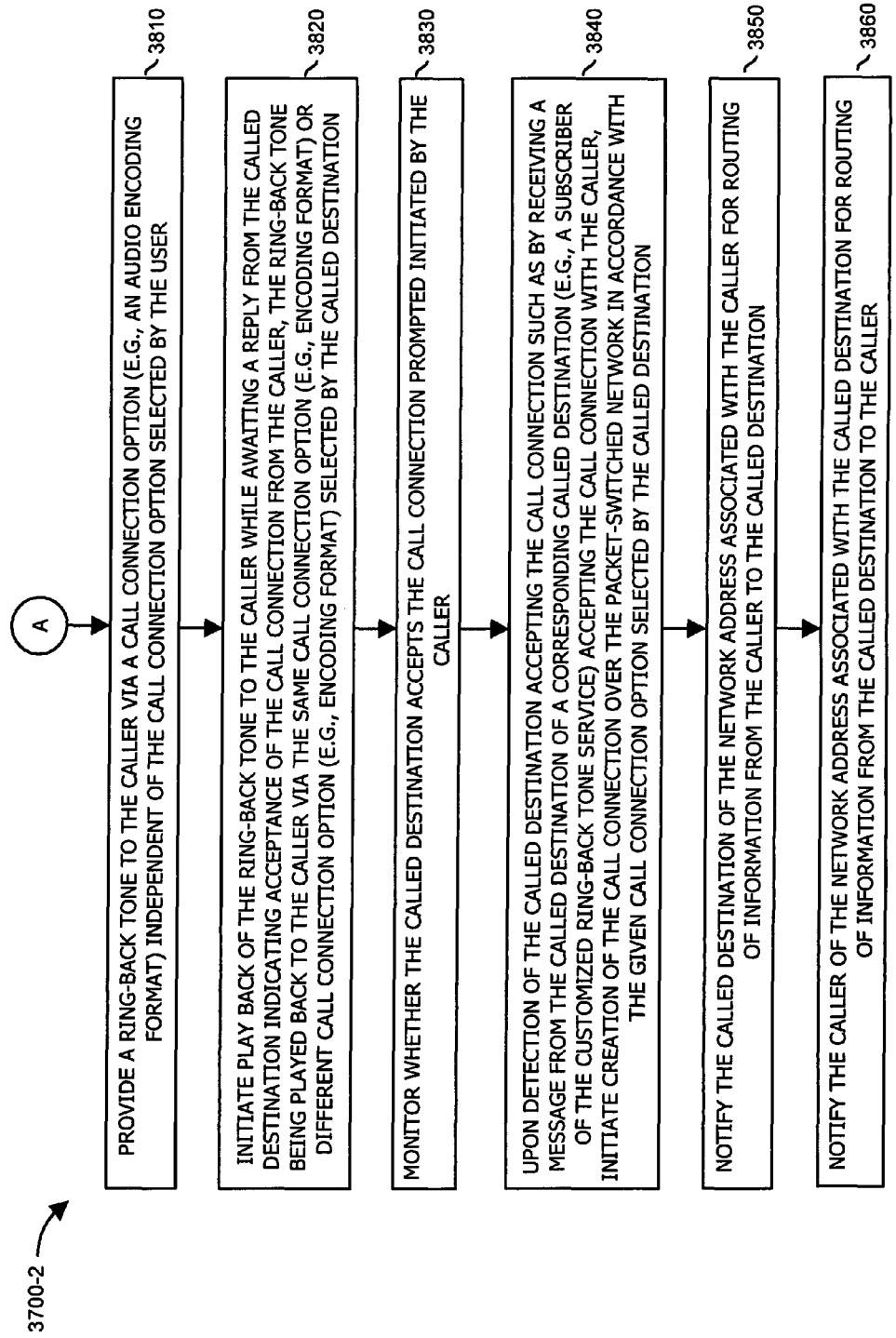

FIGS. 17 and 18 combine to form flowchart 3700 (e.g., flowchart 3700-1 and flowchart 3700-2) illustrating techniques associated with communication system 3300 according to embodiments herein. Note that techniques discussed in flowchart 3700 may overlap with the techniques discussed above in the previous figures.

In step 3710 in flowchart 3700-1 of FIG. 17, the call handler system 3350 receives request information (e.g., encoding options, call request, etc.) generated by a caller 3310 party attempting to establish a call connection with a called destination 3312 over a packet-switched network. In one embodiment, the call request information can indicate an attempt by the caller 3310 (e.g., caller party) to establish the call connection and/or corresponding acceptable call format options for communicating with the caller 3310.

In step 3720, the call handler system 3350 notifies the called destination 3312 (e.g., a user, user's phone) of a caller 3310 attempting to establish a call connection with the called destination 3312 over the packet-switched network.

In step 3730, the call handler system 3350 notifies the called destination of corresponding acceptable call connection options for communicating with the caller 3310. For example, in one embodiment, the call handler system 3350 notifies the called destination that the caller is currently attempting to establish the call connection with a subscriber (e.g., called destination 3312) and convey multiple encoding/compression options for communicating voice information to the caller 3310 attempting to establish the call connection with the called destination 3312.

In step 3740, the call handler system 3350 receives, from the called destination 3312, selection of a given call connection option to communicate with the caller 3310 amongst multiple call connection options. The given call connection option is selected (by an entity such as the called destination 3312) from the corresponding call connection options forwarded from the caller 3310 to the called destination 3312.

In step 3750, the call handler system 3350 stores received session information from the called party 3312.

In step 3760, the call handler system 3350 selects or receives selection of an encoding format for communicating a ring-back tone to the called destination 3312.

In step 3770, the call handler system 3350 selects a ring-back tone from multiple customized ring-back tones as pre-specified by a subscriber at the called destination 3312 prior to the caller 3310 attempting to reach the called destination 3312 over the packet-switched network (e.g., core network 3340).

In step 3810, the call handler system 3350 provides a ring-back tone to the caller 3310 via a call connection option (e.g., an audio encoding format) independent of the call connection option selected by the called destination 3312. In other words, the call handler system 3350 or media player system 3360 may select a high quality format for playing the ring-back tone while the format selected by the called destination 3312 may be a lower quality transmission format.

In step 3820, the call handler system 3350 initiates play back of the ring-back tone to the caller 3310 while awaiting a reply from the called destination 3312 indicating acceptance of the call connection from the caller 3310. Note that the ring-back tone can be played by the media player system 3360 back to the caller 3310 via the same call connection option (e.g., encoding format) or different call connection option (e.g., encoding format) selected by the called destination 3312.

In step 3830, the call handler system 3350 monitors whether the called destination 3312 accepts the call connection initiated by the caller 3310.

In step 3840, upon detection of the called destination 3312 accepting the call connection such as by receiving a message from the called destination 3312 of a corresponding acceptance of the call, the call handler system 3350 initiates creation of the call connection over the packet-switched network 3340 in accordance with the given call connection option selected by the called destination 3312.

In step 3850, the call handler system 3350 notifies the called destination 3312 of the IP network address associated with the caller 3310 for routing of information (e.g., voice data) from the caller 3310 to the called destination 3312.

In step 3860, the call handler system 3350 notifies the caller 3310 of the IP network address associated with the called destination 3312 for routing of information (e.g., voice data) from the called destination 3312 to the caller 3310.

Figure 19:
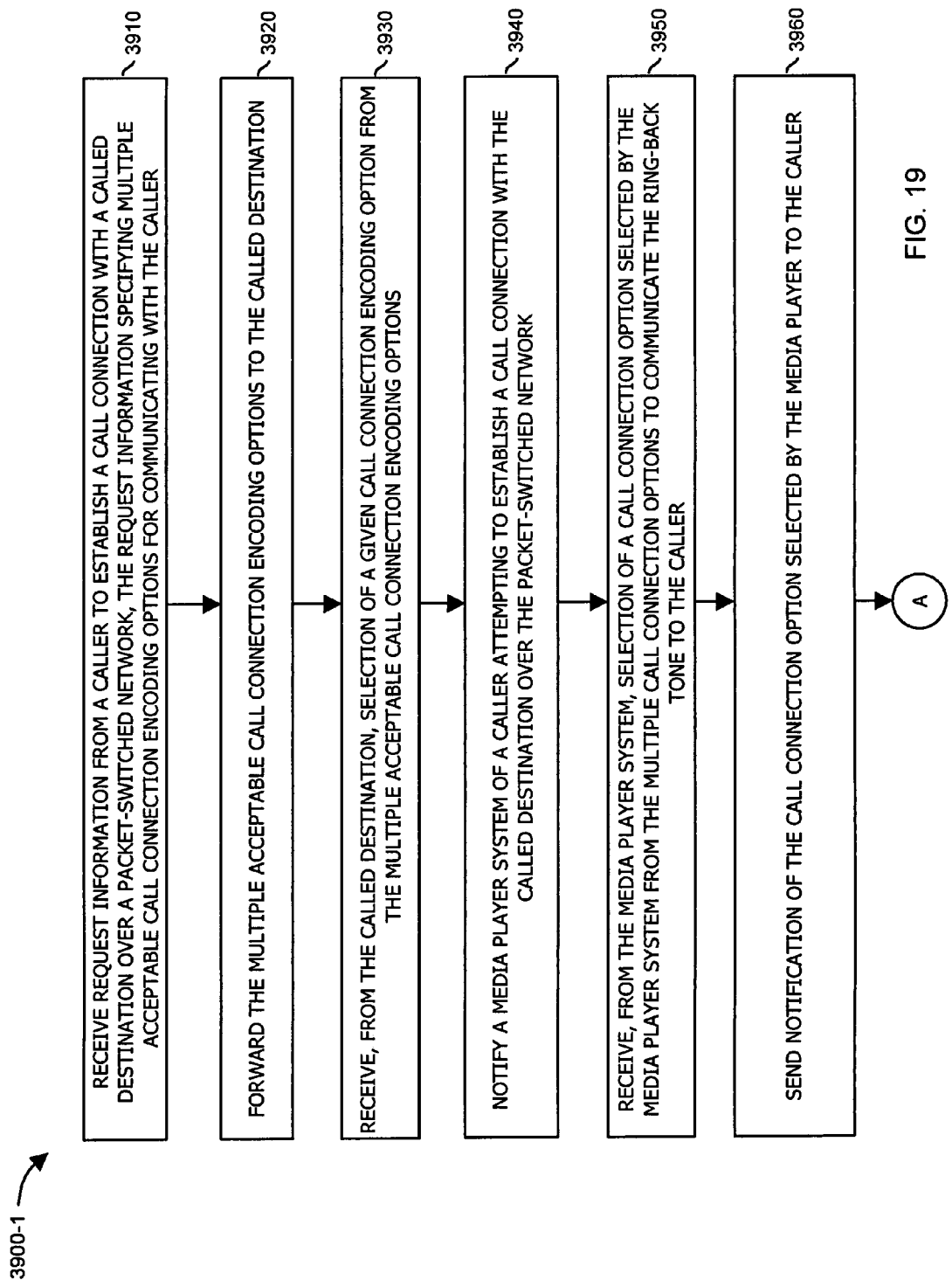
Figure 20:
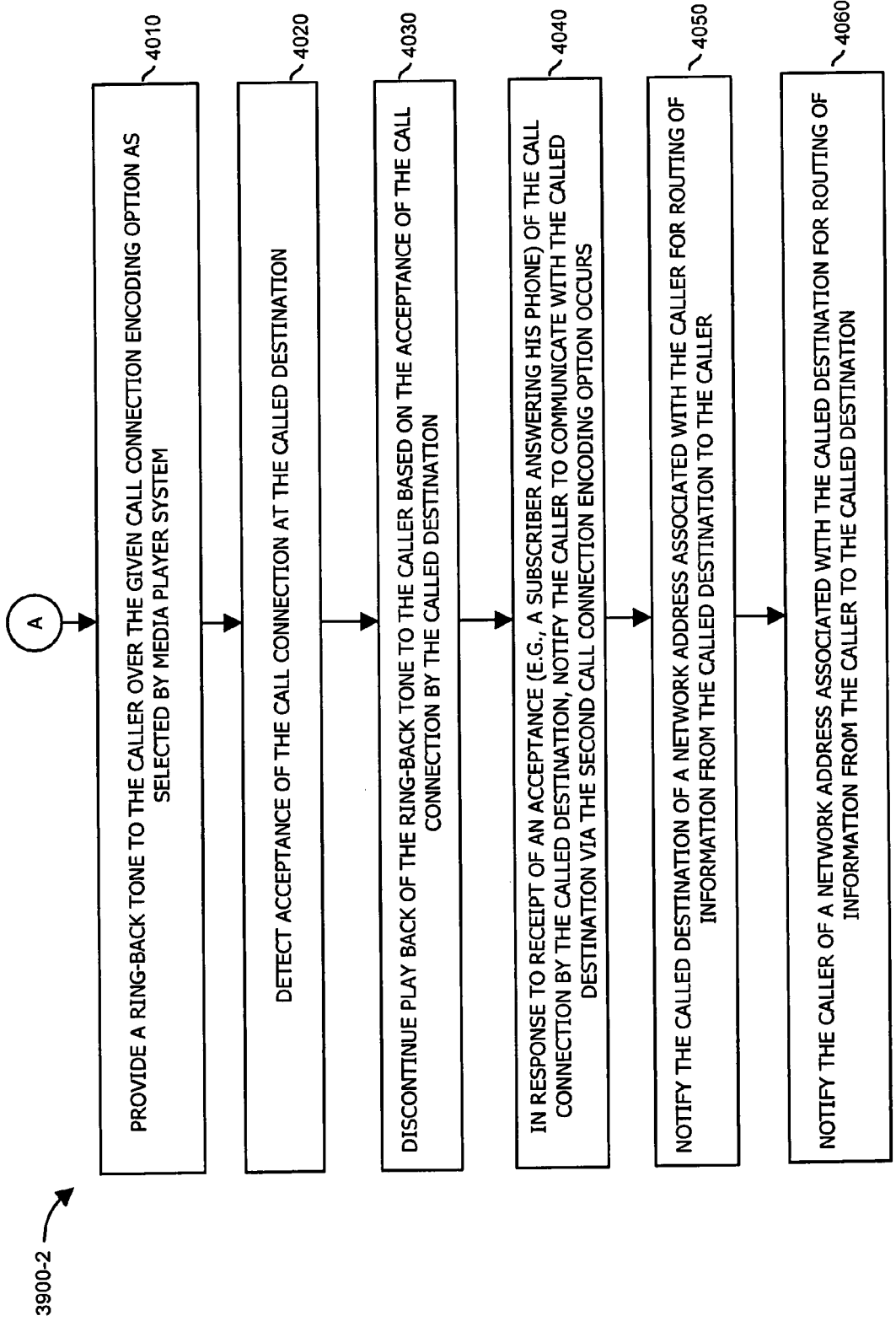

FIGS. 19 and 20 combine to form flowchart 3900 (e.g., flowchart 3900-1 and flowchart 3900-2) illustrating techniques associated with network environment 3300 (e.g., communication system) according to embodiments herein. Note that techniques discussed in flowchart 3900 may overlap with the techniques discussed above in the previous figures.

In step 3910, the call handler system 3350 receives request information from a caller 3310 to establish a call connection with a called destination 3312 over a packet-switched network. The request information specifying multiple acceptable call connection encoding options for communicating with the caller 3310.

In step 3920, the call handler system 3350 forwards the multiple acceptable call connection encoding options to the called destination 3312.

In step 3930, the call handler system 3350 receives, from the called destination 3312, selection of a given call connection encoding option from the forwarded multiple acceptable call connection encoding options.

In step 3940, the call handler system 3350 notifies a media player system 3360 of a caller 3310 attempting to establish a call connection with the called destination 3312 over the core network 3340 (e.g., packet-switched network).

In step 3950, the call handler system 3350 receives, from the media player system 3360, selection of a call connection option selected by the media player system 3360 from the multiple call connection options to communicate the ring-back tone to the caller 3310.

In step 3960, the call handler system 3350 sends notification of the call connection option selected by the media player system 3360 to the caller 3310.

In step 4010 of FIG. 40, the call handler system 3350 provides a ring-back tone to the caller 3310 over the given call connection encoding option as selected by media player system 3360.

In step 4020, the call handler system 3350 detects acceptance of the call connection at the called destination 3312.

In step 4030, the call handler system 3350 discontinues play back of the ring-back tone to the caller 3310 based on the acceptance of the call connection by the called destination 3312.

In step 4040, in response to receipt of an acceptance (e.g., a subscriber answering his phone) of the call connection by the called destination 3312, the call handler system 3350 notifies the caller 3310 to communicate with the called destination 3312 via the second call connection encoding option as previously selected by the called destination 3312.

In step 4050, the call handler system 3350 notifies the called destination 3312 of a network address associated with the caller 3310 for routing of information from the called destination 3312 to the caller 3310.

In step 4060, the call handler system 3350 notifies the caller 3310 of a network address associated with the called destination 3312 for routing of information from the caller 3310 to the called destination 3312.

While techniques herein have been particularly shown and described with references to preferred configurations thereof, it will be understood by those skilled in the art that various changes in form and details may be made therein without departing from the spirit and scope of the invention as defined by the appended claims. Such variations are intended to be covered by the scope of this invention. As such, the foregoing description of configurations is not intended to be limiting. Rather, any limitations to configurations are presented in the following claims.

What is claimed is:

1. A method comprising:
   via at least one computer device:
   notifying a called destination of a caller attempting to establish a call connection with the called destination over a packet-switched network; receiving, from the called destination, selection of a given call connection option to communicate with the caller amongst multiple call connection options;

providing a ring-back tone to the caller independent of the given call connection option selected by a user;

upon detection of the called destination accepting the call connection, initiating creation of the call connection over the packet-switched network in accordance with the given call connection option selected by the called destination;

wherein notifying the called destination of the caller attempting to establish the call connection includes notifying the called destination of a set of corresponding acceptable call connection encoding options for communicating with the caller, the set of corresponding acceptable call connection encoding options being received from the caller and forwarded to the called destination;

wherein receiving selection of the given call connection option includes receiving selection, from the called destination, of the given call connection option from the set of corresponding acceptable call connection encoding options forwarded to the called destination wherein providing the ring-back tone includes: initiating play back of the ring-back tone to the caller based on a call connection option selected by a ring-back tone generator that, independent of the called destination, generates and transmits the ring-back tone over the packet-switched network to the caller while notifying he called destination of the caller attempting to establish the call connection.

2. A method as in claim 1, wherein providing the ring-back tone includes:

initiating play back of the ring-back tone to the caller based on a selected call connection encoding option from the set of corresponding acceptable call connection encoding options other than the given call connection option selected by the called destination.

3. A method as in claim 1, wherein providing the ring-back tone includes:

selecting the ring-back tone from multiple customized ring-back tones, the selected ring-back tone being pre-specified and associated with the caller based on input from a subscriber of the called destination prior to the caller attempting to reach the called destination over the packet-switched network; and initiating play back of the ring-back tone to the caller while awaiting a reply from the called destination indicating acceptance of the call connection.

4. A method as in claim 1, wherein initiating creation of the call connection over the packet-switched network in accordance with the given call connection option selected by the called destination includes:

notifying the called destination of the network address associated with the caller for routing of information from the called destination to the caller; and notifying the caller of the network address associated with the called destination for routing of information from the caller to the called destination.

5. A method as in claim 1 further comprising:

prior to receiving the selection, notifying the called destination of multiple encoding options for communicating audio information from the called destination to the caller.

6. A method as in claim 1 further comprising:

receiving call request information generated by the caller prior to notifying the called destination of the caller attempting to establish the call connection, the call request information indicating an attempt by the caller to establish the call connection as well as the multiple call connection options for communicating with the caller.

7. A method as in claim 1, wherein detection of the called destination accepting the call connection includes receiving a message from the called destination of a corresponding subscriber accepting the call connection.

8. A method as in claim 1, wherein providing the ring-back tone to the caller independent of the given call connection option selected by the called destination includes:

notifying a media player system of the caller attempting to establish the call connection with the called destination over the packet-switched network;

receiving selection of a call connection option by the media player system to communicate the ring-back tone to the caller; and sending notification of the call connection option selected by the media player to the caller for play back of the ring-back tone.

9. A method as in claim 8, wherein initiating creation of the call connection over the packet-switched network in accordance with the given call connection option selected by the called destination includes:

notifying the called destination of the network address associated with the caller for routing of information from the called destination to the caller; and notifying the caller of the network address associated with the called destination for routing of information from the caller to the called destination.

10. The method as in claim 1, wherein the set of corresponding acceptable call connection encoding options indicates multiple formats suitable for transmitting data to the caller.

11. A computer program product including a non-transitory computer-readable medium having instructions stored thereon for processing data information, such that the instructions, when carried out by a processing device, enable the processing device to perform the steps of:

notifying a called destination of a caller attempting to establish a call connection with the called destination over a packet-switched network;

receiving, from the called destination, selection of a given call connection option to communicate with the caller amongst multiple call connection options;

providing a ring-back tone to the caller independent of the given call connection option selected by the user;

upon detection of the called destination accepting the call connection, initiating creation of the call connection over the packet-switched network in accordance with the given call connection option selected by the called destination;

wherein notifying the called destination of the caller attempting to establish the call connection includes notifying the called destination of a set of corresponding acceptable call connection encoding options for communicating with the caller, the set of corresponding acceptable call connection encoding options being received from the caller and forwarded to the called destination; and wherein receiving selection of the given call connection option includes receiving selection, from the called destination, of the given call connection option from the set of corresponding acceptable call connection encoding options forwarded to the called destination.

12. A method comprising:

receiving request information from a caller to establish a call connection with a called destination over a packet-switched network, the request information specifying multiple acceptable encoding options for communicating with the caller;

forwarding the multiple encoding options to the called destination;

receiving, from the called destination, selection of a given call connection encoding option from the multiple encoding options;

notify a media player system of a caller attempting to establish a call connection with the called destination over the packet-switched network;

receiving, from the media player system, selection of a call connection option selected by the media player system from the multiple encoding options to communicate the ring-back tone to the caller;

sending notification of the encoding option selected by the media player to the caller;

providing a ring-back tone to the caller via the encoding option selected by media player system;

detecting acceptance of the call connection by the called destination;

discontinuing play back of the ring-back tone to the caller based on the acceptance of the call connection by the called destination; in response to being notified of the acceptance of the call connect by the called destination, notifying the caller to communicate with the called destination via a second encoding option;

notifying the called destination of a network address associated with the caller for routing of information from the called destination to the caller; and notifying the caller of a network address associated with the called destination for routing of information from the caller to the called destination.

13. A method comprising:

receiving request information generated by a caller attempting to establish a call connection with a called destination over a packet-switched network, the call request information indicating an attempt by the caller to establish the call connection and corresponding acceptable call format encoding options for communicating with the caller;

notifying the called destination of the caller attempting to establish the call connection;

notifying the called destination of the corresponding acceptable call format encoding options for communicating with the caller;

receiving, from the called destination, selection of a given call format encoding option to communicate with the caller, the called destination selecting the given call format encoding option from the corresponding acceptable call format encoding options;

storing session information received from the called party;

receiving selection of an encoding format for communicating a ring-back tone to the called party;

selecting a ring-back tone from multiple customized ring-back tones;

providing the selected ring-back tone to the caller via a different call format encoding option than the given call format encoding option selected by the called destination;

initiating play back of the ring-back tone to the caller while awaiting a reply from the called destination indicating acceptance of the call connection from the caller;

monitoring whether the called destination accepts the call connection;

upon detection of the called destination accepting the call connection by receiving a message from the called destination, initiating creation of the call connection over the packet-switched network in accordance with the given call format encoding option selected by the called destination.

\* \* \* \* \*